United States Patent
Gendron et al.

(10) Patent No.: US 7,990,804 B2
(45) Date of Patent: Aug. 2, 2011

(54) METHOD AND SYSTEM FOR REAL-TIME AUTOMATED CHANGE DETECTION AND CLASSIFICATION FOR IMAGES

(75) Inventors: Marlin L Gendron, Pass Christian, MS (US); Maura C Lohrenz, Pearl River, LA (US); Lancelot M Riedlinger, Lacombe, LA (US); James A. Hammack, Long Beach, MS (US); Charles B. Martin, Slidell, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 441 days.

(21) Appl. No.: 12/125,555

(22) Filed: May 22, 2008

(65) Prior Publication Data

US 2009/0016161 A1 Jan. 15, 2009

Related U.S. Application Data

(63) Continuation-in-part of application No. 11/949,685, filed on Dec. 3, 2007, now abandoned.

(60) Provisional application No. 60/868,151, filed on Dec. 1, 2006.

(51) Int. Cl.
*G01S 15/89* (2006.01)
(52) U.S. Cl. ............................................. 367/88
(58) Field of Classification Search .................. 367/88
See application file for complete search history.

(56) References Cited

U.S. PATENT DOCUMENTS 6,218,965 B1 4/2001 Gendron et al.

OTHER PUBLICATIONS

Gendron et al., "The automatic change detection and classification—real time (ACDC-RT) system," Proceeding of the Undersea Defense TechnologyPacific 2006, Dec. 2006, San Diego, CA.*
Gendron, M.L., "Algorithms and Data Structures for Automated Change Detection and Classification of Sidescan Sonar Imagery", dissertation submitted to U. of New Orleans in Dec. 2004, cataloged Jan 28, 2005, pp. 1-120.
Cronin, D., Broadus, M., Reed, B., Byrne, S., Simmons, W., Gee, L., "Hydrographic Work Flow—From Planning to Products", US Hydrographic Society, Proceedings of the U.S. Hydro 2003 Conference, Mar. 24-27, 2003, pp. 1-13.
Gendron, M.L., Lohrenz, M.C., "The Automated Change Detection and Classification Real-time (ACDC-RT) System", IEEE/MTS Oceans 2007—Europe, Jun. 2007, paper No. 070119-003, DOI 10.1109/OCEANSE.2007.4302387, pp. 1-4.
Gendron, M.L., Lohrenz, M.C., Layne, G., "Demonstration of the Automated Change Detection and Classification (ACDC) System During the Gulf of Mexico FY05 Naval Exercise (GOMEX-05)", Naval Research Laboratory Formal Report, No. 7440-05-10,105, pp. 1-11, Apr. 2005. Kenny A. J., Cato, I., Desprez, M., Fader, G., Schuttenhelm, R.T.E., Side, J., "An Overview of seabed-mapping technologies in the context of marine habitat classification", ICES Journal of Marine Science, vol. 60, No. 2, pp. 411-418, 2003.
Kruger, V.and Sommer, G., "Affine Real-Time Face Tracking using Gabor Wavelet Networks," Proc. 15th International Conference on Pattern Recognition (ICPR'00), vol. 1, pp. 127-130, 2000.

* cited by examiner

*Primary Examiner* — Ian J Lobo
(74) *Attorney, Agent, or Firm* — Amy I. Ressing; Kathleen Chopman

(57) ABSTRACT

A computer based system and method for real-time display of co-registered historical and current side scan sonar imagery during a side scan sonar survey. Embodiments also include modules for detection of clutter in the current imagery, identification of features, extraction of snippets, filtering based on predetermined size and shape parameters, and determination if a current feature is the same as a previously identified contact from historical imagery.

20 Claims, 25 Drawing Sheets

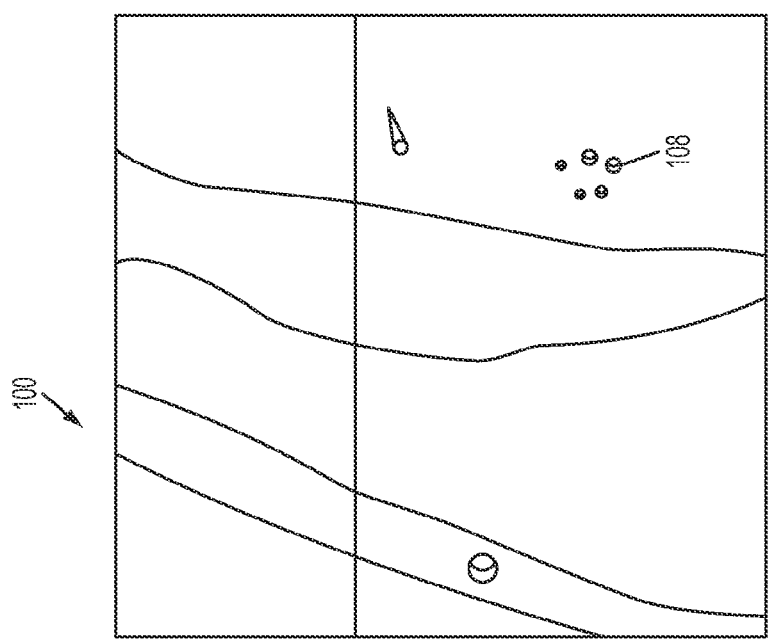
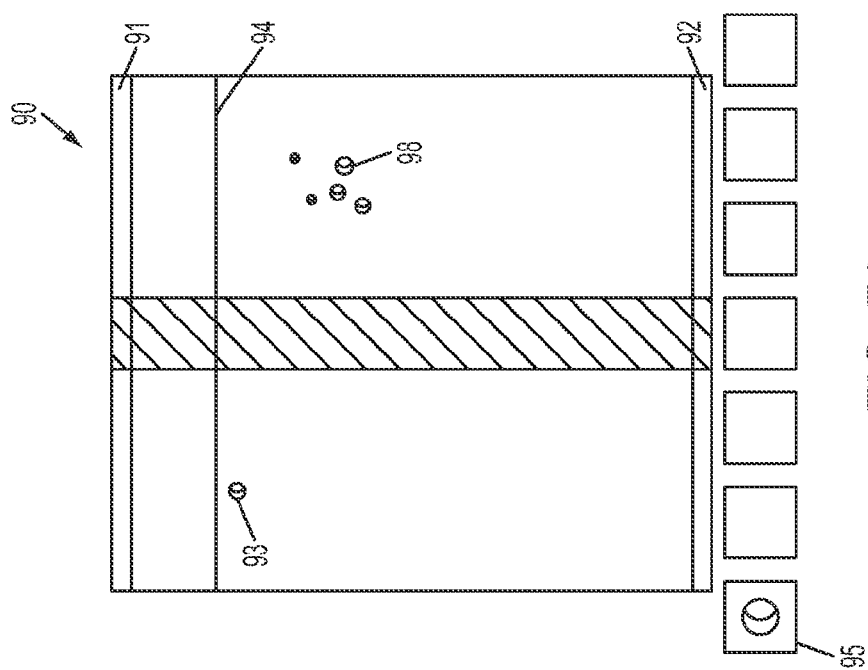

| RUN # | TOTAL # DETECTIONS | # CORRECT DETECTIONS | PROBABILITY OF CORRECT DETECTIONS ($P_c$) | # FALSE ALARMS | PROBABILITY OF FALSE ALARMs ($P_{fa}$) | A | B |
|---|---|---|---|---|---|---|---|
| 1 | 2 | 2 | 4 | 0 | 0 | 0.100 | 1.000 |
| 2 | 7 | 7 | 15 | 0 | 0 | 0.108 | 1.020 |
| 3 | 9 | 9 | 19 | 0 | 0 | 0.116 | 1.040 |
| 4 | 14 | 14 | 29 | 0 | 0 | 0.124 | 1.060 |
| 5 | 16 | 15 | 31 | 1 | 6 | 0.132 | 1.080 |
| 6 | 17 | 16 | 33 | 1 | 6 | 0.140 | 1.100 |
| 7 | 18 | 17 | 35 | 1 | 6 | 0.148 | 1.120 |
| 8 | 20 | 18 | 38 | 2 | 10 | 0.156 | 1.140 |
| 9 | 26 | 23 | 48 | 3 | 12 | 0.164 | 1.160 |
| 10 | 30 | 26 | 54 | 4 | 13 | 0.172 | 1.180 |
| 11 | 32 | 28 | 58 | 4 | 13 | 0.180 | 1.200 |
| 12 | 33 | 28 | 58 | 5 | 15 | 0.188 | 1.220 |
| 13 | 35 | 29 | 60 | 6 | 17 | 0.196 | 1.240 |
| 14 | 38 | 29 | 60 | 9 | 24 | 0.204 | 1.260 |
| 15 | 40 | 30 | 63 | 10 | 25 | 0.212 | 1.280 |
| 16 | 40 | 30 | 63 | 10 | 25 | 0.220 | 1.300 |
| 17 | 42 | 31 | 65 | 11 | 26 | 0.228 | 1.320 |
| 18 | 46 | 33 | 69 | 13 | 28 | 0.236 | 1.340 |
| 19 | 51 | 34 | 71 | 17 | 33 | 0.244 | 1.360 |
| 20 | 52 | 34 | 71 | 18 | 35 | 0.252 | 1.380 |
| 21 | 54 | 35 | 73 | 19 | 35 | 0.260 | 1.400 |
| 22 | 56 | 36 | 75 | 20 | 36 | 0.268 | 1.420 |
| 23 | 61 | 38 | 79 | 23 | 38 | 0.276 | 1.440 |
| 24 | 61 | 38 | 79 | 23 | 38 | 0.284 | 1.460 |
| 25 | 73 | 44 | 92 | 29 | 40 | 0.292 | 1.480 |

FIG. 14

| RUN # | TOTAL # DETECTIONS | # CORRECT DETECTIONS | $P_c$ | # FALSE ALARMS | $P_{fa}$ |
|---|---|---|---|---|---|
| 1 | 2 | 2 | 4 | 0 | 0 |
| 2 | 7 | 7 | 15 | 0 | 0 |
| 3 | 9 | 9 | 19 | 0 | 0 |
| 4 | 14 | 14 | 29 | 0 | 0 |
| 5 | 15 | 15 | 31 | 0 | 0 |
| 6 | 16 | 16 | 33 | 0 | 0 |
| 7 | 17 | 17 | 35 | 0 | 0 |
| 8 | 18 | 18 | 38 | 0 | 0 |
| 9 | 23 | 23 | 48 | 0 | 0 |
| 10 | 26 | 26 | 54 | 0 | 0 |
| 11 | 28 | 28 | 58 | 0 | 0 |
| 12 | 28 | 28 | 58 | 0 | 0 |
| 13 | 29 | 29 | 60 | 0 | 0 |
| 14 | 29 | 29 | 60 | 0 | 0 |
| 15 | 30 | 30 | 63 | 0 | 0 |
| 16 | 30 | 30 | 63 | 0 | 0 |
| 17 | 32 | 31 | 65 | 1 | 3 |
| 18 | 34 | 33 | 69 | 1 | 3 |
| 19 | 35 | 34 | 71 | 1 | 3 |
| 20 | 35 | 34 | 71 | 1 | 3 |
| 21 | 37 | 35 | 73 | 2 | 5 |
| 22 | 38 | 36 | 75 | 2 | 5 |
| 23 | 41 | 38 | 79 | 3 | 7 |
| 24 | 41 | 38 | 79 | 3 | 7 |
| 25 | 48 | 44 | 92 | 4 | 8 |

FIG. 15

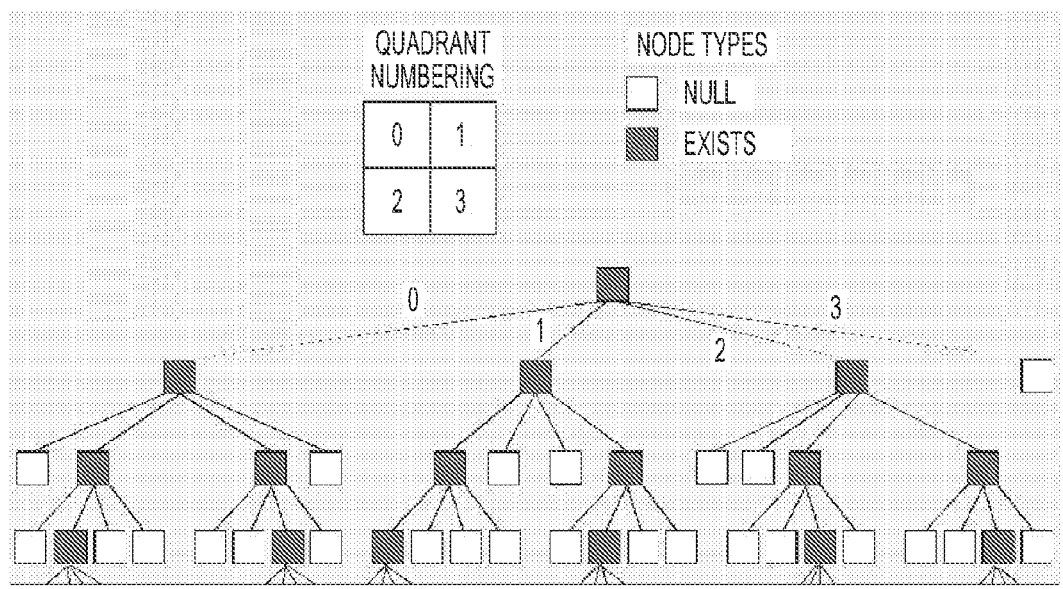
FIG. 20
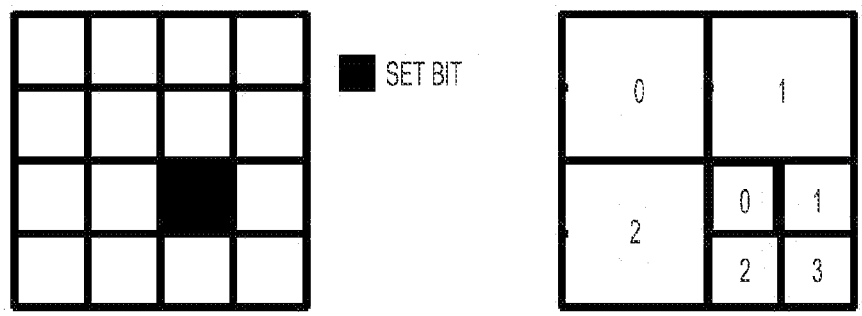
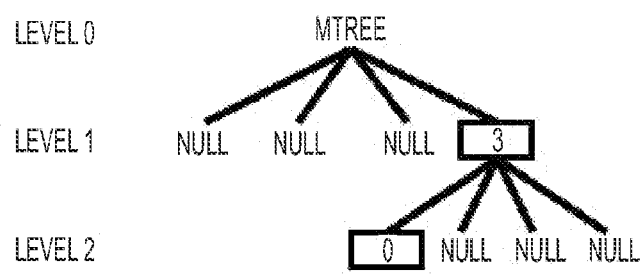
FIG. 21

METHOD AND SYSTEM FOR REAL-TIME AUTOMATED CHANGE DETECTION AND CLASSIFICATION FOR IMAGES

CROSS-REFERENCE TO RELATED APPLICATIONS

This Application is a continuation-in-part of application Ser. No. 11,949,685, filed on Dec. 3, 2007, which is a non-provisional application of provisional application (35 USC 119(e)) 60/868,151 filed on Dec. 1, 2006. The entire disclosures of these applications are incorporated by reference herein.

BACKGROUND OF THE INVENTION

Sidescan sonar was originally developed by Dr. Harold Edgerton at the Massachusetts Institute of Technology in the 1960's. Current side scan sonar systems are towed from a platform, such as a ship or helicopter, hull-mounted on a surface ship, or carried on an undersea vehicle. The undersea vehicle can be an autonomous undersea vehicle (AUV) or a towed undersea vehicle 10, as shown in FIG. 1. The sidescan sonar system transmits an acoustical beam on each side of a transducer, or "fish". The beams are sent in a wide angular pattern down to the bottom in swaths 50-500 meters wide, and the echoes are returned creating a narrow strip below and to the sides of the transducer track.

The undersea vehicle is often equipped with a pressure or altimeter sensor that allows it to follow the bottom while maintaining a constant height above the seafloor or alternatively "fly" at a constant depth below the surface. Important measurements such as heading, pitch, and roll are recorded on-board the AUV or, in the case of towed transducers, are often transmitted up the towing cable and recorded separately on the towing vessel.

Surveys are frequently accomplished as a series of parallel tracks over the seabed, with some overlapping area to ensure that the nadir of one survey track is covered by another survey track. Survey planning is discussed generally in "Hydrographic Work Flow—From Planning to Products", by D. Cronin et al., 2003.

Because the Global Positioning Systems (GPS) does not function underwater, the position of cable-towed transducers is calculated from the GPS location of the surface vessel by using a cable layback model or acoustic tracking system.

FIG. 1 depicts a side scan sonar on an undersea vehicle being towed over the seafloor. The sonar beams strike the seafloor and are reflected back to the sonar system. Processing and sampling the raw sidescan data forms scanlines that make up grayscale side scan imagery (SSI), shown in FIG. 2. The side scan sonar cannot image the area of the seabed directly below the fish due to the spreading of the beams. This area is known as the nadir.

Objects close to or on the seafloor, such as mines, can be detected with SSI. These objects, or contacts, show up in the SSI as bright spots with adjacent shadows that face perpendicular away from nadir. Features of various shapes and sizes can be detected by the shadows, and the size of the shadow varies as a function of beam angle and feature dimensions. FIG. 3 shows an example of a small image extracted from SSI called a snippet that contains a contact. The U.S. Navy's Naval Oceanographic Office (NAVOCEANO) maintains a Master Contact Database (MCDB) containing thousands of features detected from SSI worldwide since the early 1990's.

The SSI is stored in NAVOCEANO's Unified Sonar Image Processing System (UNISIPS) format. Each scan line of the imagery is stored in a separate record, and the latitude and longitude coordinate, the sonar heading, speed, and depth above the seafloor are given for the sample at nadir.

By its nature, SSI is non-linear. Further, correlation between pixels in SSI is affected by "speckle" noise, which can also hamper the extraction of targets and features in sidescan imagery. In addition, the side scan imagery can contain phantom features created by surface return when the sonar is in shallow water or when the fish is pitched up or down. GPS signal dropout at the surface can also cause the imagery processing software to lose scan lines or to duplicate others.

Bottom objects and features can also change and migrate over time due to ocean currents and burial by sediment. Even when the objects are stationary, one of the biggest issues with sidescan sonar imagery is position error, often observed to be 15 m or greater during actual surveys. The center latitude/longitude position of each scan line in the UNISIPS file includes an estimate of position error due to GPS error and error from the cable layback model.

Change detection is the process of identifying differences in the state of an object or phenomenon by observing it at different times. The term "digital change detection" applies when computer algorithms are used to perform related change detection tasks commonly on data collected by a remote sensing device. Digital change detection is a major application of remote-sensed data, and some change detection techniques have been applied to satellite imagery and sonar imagery.

Currently, a side scan sonar survey is accomplished, and operators display and examine the side scan sonar data after the survey is complete. If the operator sees something that may be a contact on the side scan sonar image, the operator looks through the MCDB to see whether there is a nearby contact, and pulls up the UNISIPS format data and image from one or more previous surveys. The operator then compares the "new" side scan sonar image with the images of contacts in the nearby area and determines whether the new contact is the same as a previously found contact.

BRIEF SUMMARY OF THE INVENTION

One embodiment of the invention is directed to a system and method for processing real-time side scan sonar imagery, including displaying change detection side scan sonar imagery during the change detection side scan sonar survey, and simultaneously displaying historical side scan sonar imagery in an area-based tile format from one or more previous side scan sonar surveys of the same geospatial location, the historical side scan sonar imagery that is displayed being geospatially co-registered with a current geospatial position of the side scan sonar. The historical side scan sonar imagery was converted from time-based data files into area-based tiles.

In an exemplary embodiment, the time-based side scan sonar imagery is UNISIPS format data.

The method can also include rotating the displayed historical side scan sonar data to match the heading of the change detection side scan sonar as the data is displayed.

The method can also include automatically determining whether a feature in the change detection side scan sonar imagery is present in the historical side scan sonar imagery.

The method can also include saving the position of features in the change detection side scan sonar imagery, saving snippets of the feature, and displaying the snippets.

The historical side scan sonar imagery can be converted from time-based data files into area-based tiles before beginning the change detection side scan survey.

The method can also include processing the features in the change detection side scan sonar imagery to determine whether they are within a predetermined size and shape range.

The method can also include updating the historical display during the change detection survey. Steps for updating the historical display include computing the LAT/LON extents of the entire historical display based on the change detection survey imagery's LAT/LON position and heading, computing the minimum and maximum tile rows and columns and determining which tiles are geographically inside the display extents, rotating each sample within each of the tiles to match the new imagery heading, and displaying the rotated samples on the display of the historical side scan imagery.

The method can also include automated detection of clutter on the seafloor by calculating an upper threshold and a lower threshold for each scanline, wherein pixels in the scanline with a sample value above an upper threshold are brights, and pixels in the scanline with a sample value below a lower threshold are shadows. The calculating of an upper threshold and a lower threshold can take into consideration only pixels outside a nadir portion of the scanline. The method can also include examining scanlines to detect runs of shadows followed by runs of brights.

The method can also include receiving in instruction from an operator to process an object in the change detection survey side scan sonar imagery, determining whether a size and shape of the selected object are within a predetermined range, and determining whether the object matches an object in the historical side scan sonar imagery. The method can also include displaying a box around the user-selected object on the change detection side scan sonar display; and changing the color of the box if the object is matched to an object in the historical side scan sonar imagery.

Another embodiment of the invention is directed to a system and method for identifying clutter in the side scan sonar imagery of a seafloor including calculating an upper threshold and a lower threshold for each scanline in side scan sonar imagery, wherein pixels in the scanline with a sample value above an upper threshold are brights, and pixels in the scanline with a sample value below a lower threshold are shadows, examining scanlines to detect runs of shadows followed by runs of brights; and determining whether the shadow falls away from nadir and has an adjacent bright closer to nadir and whether the length of the shadow is consistent with a preset object size. The method can also include creating a snippet centered on the center of the bright by creating a box around the center point, the box having a preset dimension around the object; and saving the image within the box in a UNISIPS format.

An embodiment of the invention is directed to a system and method for determining if a contact in change detection side scan sonar imagery matches a previously found contact in the historical side scan sonar imagery of the same geospatial location, the historical side scan sonar imagery being in area-based tile format. The method includes for each contact in the change detection sonar imagery, finding contacts in the historical side scan sonar data in a region of uncertainty generated around the change detection sonar contact, and identifying the found historical contacts as a possible match. If no historical contact falls within the region of uncertainty, returning all historical contacts that have an uncertainty region that overlaps the uncertainty region of the change detection sonar contact, and identifying the returned historical contacts as possible matches.

The method can also include, if no matches between the historical data and the change detection sonar survey contact are found, identifying the change detection sonar survey contact as a new contact, and saving the geospatial position and an image file of the new contact.

BRIEF DESCRIPTION OF THE DRAWINGS

FIGS. 7A and 7B are examples of the side by side co-registered displays of historical and real-time sonar imagery in accordance with an embodiment of the invention.

FIGS. 14, 15, and 16 compare results for using the automated clutter detection algorithm with and without a completion module in accordance with an embodiment of the invention.

FIG. 20 depicts four levels of a quadtree.

FIG. 21 illustrates a modified quadtree for use in a computer aided search algorithm, in accordance with an embodiment of the invention.

DETAILED DESCRIPTION OF EMBODIMENTS OF THE INVENTION

An embodiment of the invention is directed to a computer based sonar processing system that aids sonar imagery analysts in performing change detection in real time. The system can be operated in real-time as the sonar system is collecting data.

In this discussion, the term "change detection survey" is used to describe the current survey of an area that has been previously surveyed.

Figure 1:
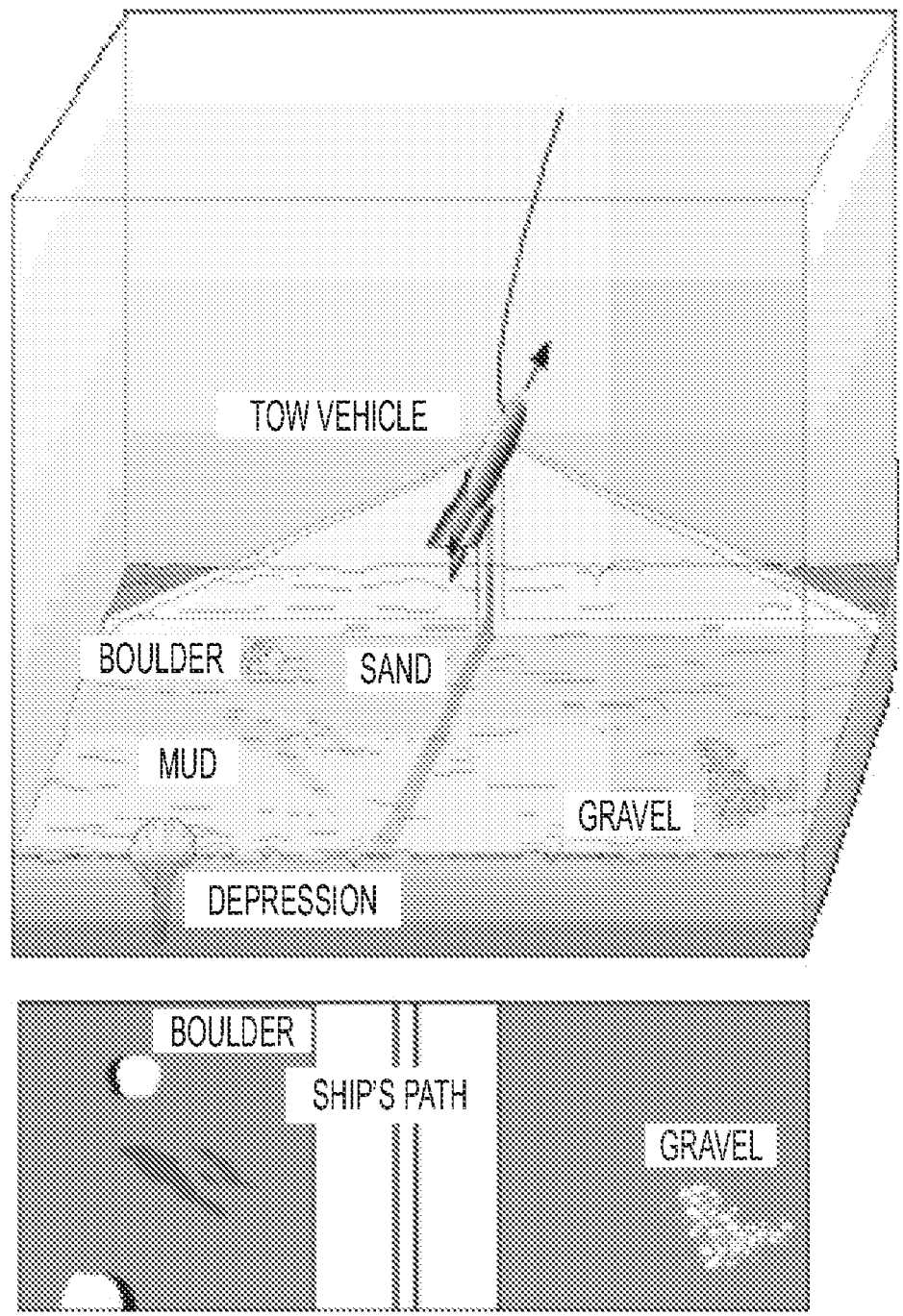
FIG. 1 is an illustration of a sidescan sonar system being towed by a surface ship to scan the seabed.
Figure 2:
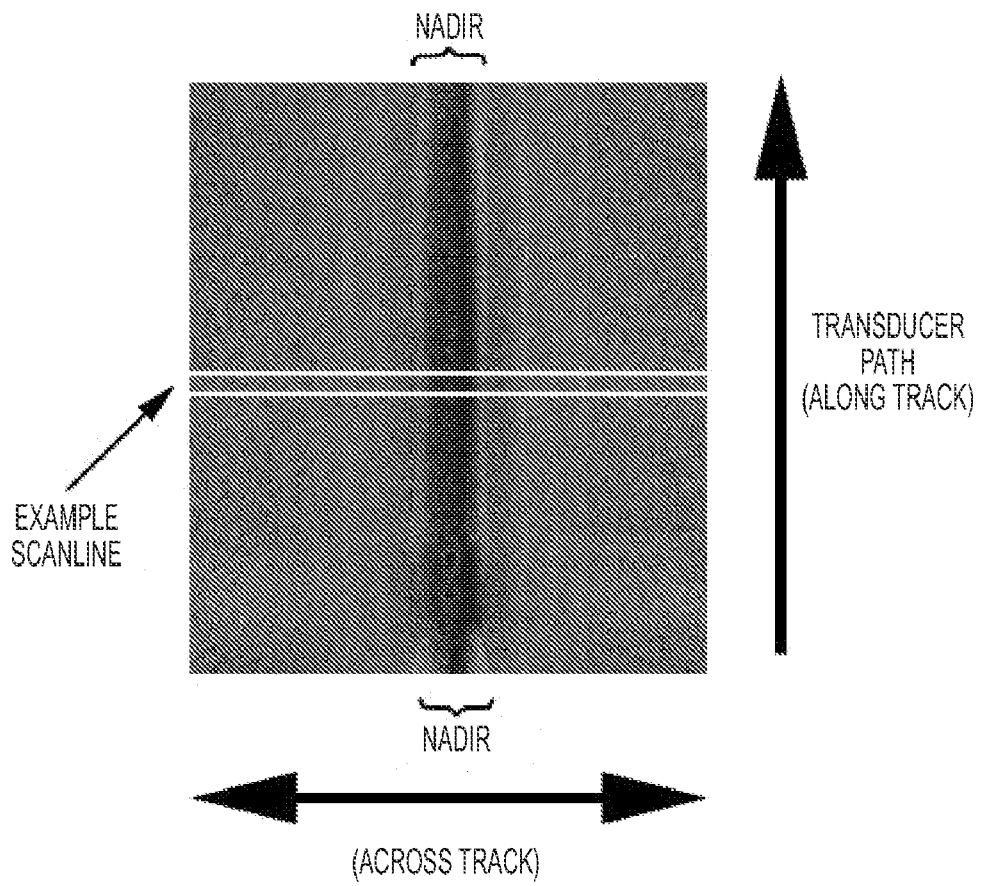
FIG. 2 is an illustration of grayscale side scan imagery.
Figure 3:
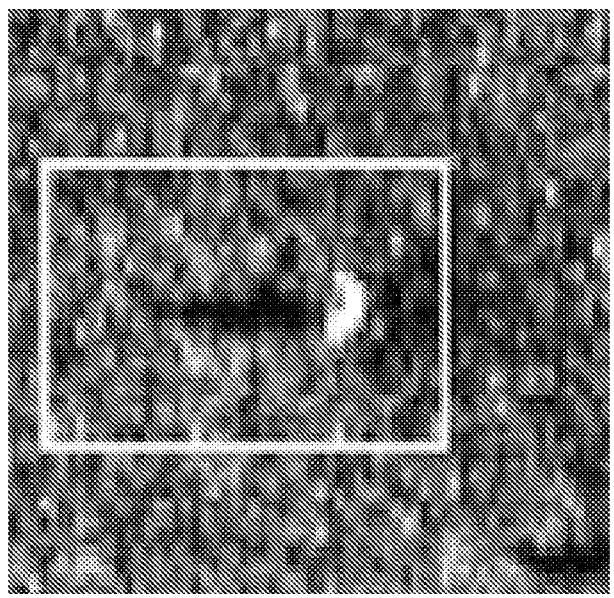
FIG. 3 is an example of a small image (snippet) extracted from side scan imagery.
Figure 4:
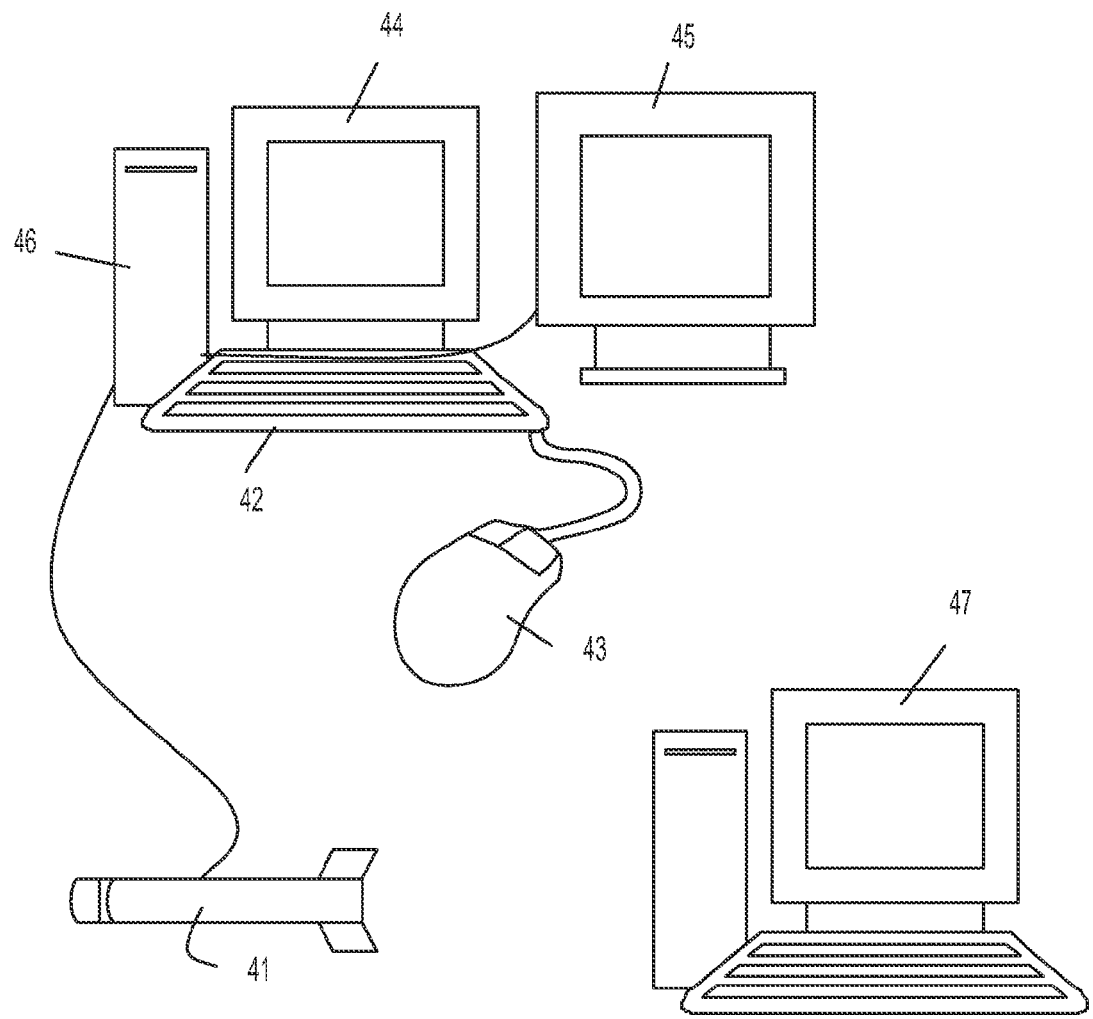
FIG. 4 illustrates a side scan sonar processing system in accordance with an embodiment of the invention.

In an exemplary embodiment shown in FIG. 4, the system includes a computer processor 46, one or more user input devices, and two display screens. One display screen 44 shows a real-time waterfall image of the sidescan sonar image collected as the fish is towed over the seafloor. The other display screen 45 shows the historical sidescan sonar image of the same georeferenced seabed area from one or more previous surveys of the same location. Alternatively, the imagery from the change detection survey and the historical imagery can be shown side-by-side on a single display screen.

The user input devices can include a keyboard 42, mouse 43, pointer, or touchscreen. The sidescan sonar data is collected by a sidescan sonar system 41 onboard a towed undersea vehicle 40 as shown in FIG. 4. The sidescan sonar system 41 can also be mounted on the hull of a ship, towed by a ship or helicopter, or carried on an autonomous undersea vehicle. The system can also include a wireless communication system used to send side scan sonar images of contacts to other vessels, such as mine hunters. Additional displays can include a display of the vessel heading, track, and coverage area, and a display of the imagery being sent to the other vessel.

The system can also include second operator computer station 47, which receives information from the first computer station for further processing or a final decision about a feature identified on the side scan sonar.

The computer processor 46 includes software with several modules for accomplishing necessary functions for real-time display and comparison of side scan sonar imagery and for real-time change detection between the current imagery and historical side scan sonar imagery. The modules include a module for displaying the historical imagery geospatially co-registered with the current sonar heading and location, and one or more of a module for automatic detection, a completion module, a computer-aided search module, and a feature matching module.

The historical sidescan imagery is derived from data that has been processed into imagery by the NAVOCEANO and stored in the Unified Sonar Image Processing System (UNISIPS) format. Each scan line is stored in the UNISIPS file as a separate record. Each record stores the latitude and longitude (LAT/LON) value of the center-scanline sample (nadir), the sonar heading, resolution, depth above the seafloor, and the sonar return intensity values for the scanline. When a change detection survey is to be conducted, NAVOCEANO typically provides the necessary UNISIPS files that contain the previous survey data. The files may contain survey data from more than one survey, if one survey had gaps in coverage. The UNISIPS format is discussed generally at page 34 of Oceanography and Mine Warfare, Commission on Geosciences, Environment and Resources Ocean Studies Board, and in S. Lingsch and C. Robinson, "Processing, presentation, and data basing of acoustic imagery", Oceans '95 MTS/IEEE Conference Proceedings, Vol. 3, October 1995, pp. 1582-91.

The historical sidescan sonar image can be displayed directly from the UNISIPS files. This is acceptable if the track lines of the change detection survey are very close to the track lines of the historical survey, however, it is of limited value if the track lines and/or angle of attack are different.

Real-Time Display of Co-Registered Historical SSI Imagery

Figure 5:
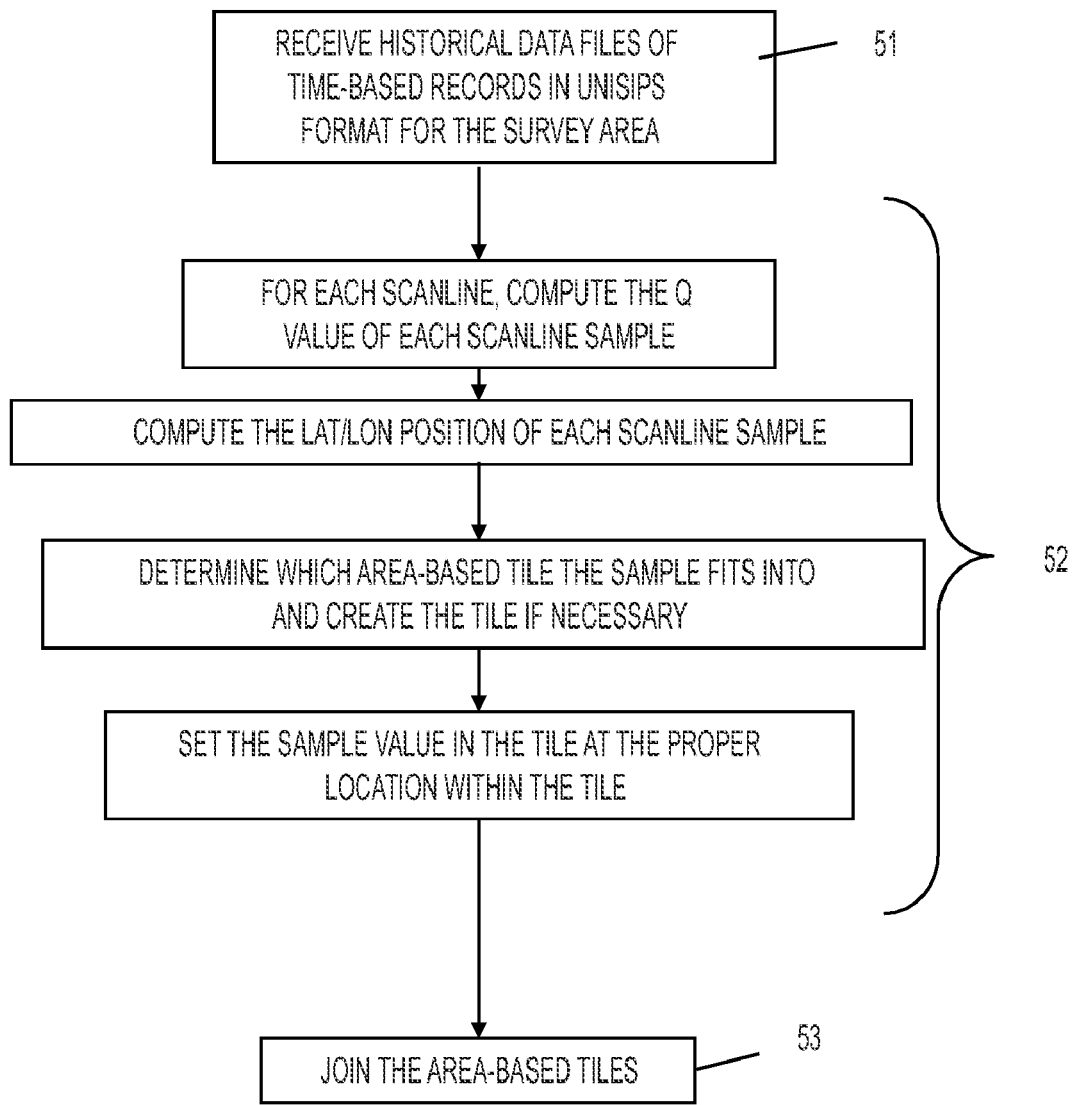
FIG. 5 illustrates steps in a method for processing side scan sonar data in accordance with an embodiment of the invention.

In an exemplary embodiment shown in FIG. 5, the computer processor receives the historical files in UNISIPS format that cover the planned survey area 51, then converts the historical imagery into an area-based format instead of the time-based scanline format 52. The processor also allows the display to rotate the historical imagery to match the heading of the new imagery as necessary. To do this, the time-based historical imagery is first converted to area-based tiles. This is done once at the beginning of a change detection survey. The conversion can be done anytime after the change detection survey is planned and before the change detection survey is started. The resolution of the tiles is set to be the same as the UNISIPS files.

During the change detection survey, the area-based tiles that correspond geographically to the new imagery being displayed are then joined or "knitted" together and rotated to match the currents heading of the (new imagery) sonar.

Each historical UNISIPS file is tiled separately, but more than one UNISIPS file can contribute to a tile. Tiling begins by opening a UNISIPS file and processing one scanline at a time. The port and starboard halves of each scanline are processed identically, so this document will only describe the starboard processing, which will just be referred to as "scanline" from now on.

The scanline is divided into three sections, called Q's, based on the quality of the sidescan imagery. Sidescan sonars are "blind" directly (at nadir), so in the first quarter of the inner-most samples of the scanline, the samples are given the lowest Q values of zero. The sidescan imagery on the outer ¼ of the scanline is given a better Q value of one, because bottom objects are sometimes distorted in this region, but are still visible. Finally, the middle half of the scanline is give the highest Q value of 2. This middle region is referred to as the "sweet spot".

Three Q-valued tiles based on the geographic area are created (if they were not already created for a previous scanline). The scanline samples are placed in the correct tile based on the sample's Q value and geographic location.

Suitable steps for creating tiles with Q values include:
1) Compute the Q (0, 1, or 2) of the scanline sample for each scanline sample in the scanline, as discussed above.
2) Compute the LAT/LON position of the scanline sample for each scanline sample. Note that the LAT/LON value of any sample along the scanline can be computed using the LAT/LON of the center sample (nadir), survey heading, the resolution of the sonar system, and the depth above seafloor.
3) Determine the unique tile based on a geographic tiling scheme (described in the next paragraph).
4) Create (allocate memory for) the tile if it has not already been created. If it has, then retrieve the tile from memory.
5) Set the sample value in the tile at the proper location if the location is empty, i.e., not set by a previous scanline sample. The sample value is the intensity of the sonar return at the sample location. The number of increments for the sample value can be any suitable number, such as 256, or greater or fewer. If the number of possible sample values is 256, the values assigned can be 1-255 and NULL representing zero intensity. The NULL value allows programs to distinguish a point with no data from a point with zero intensity.

In an exemplary embodiment, the geographic tiling method includes creating tiles by first finding the extent of the historical survey area by identifying the four corners. The tiles are defined to have the same resolution as the historical sonar data from the UNISIPs file. For example, if the sonar data has a 10 cm resolution, the position of the sample in the tile also has a 10 cm resolution. In an exemplary embodiment, the tiles will always have an upper edge facing in a predetermined direction, such as north. Each tile will have an extent that keeps the tile's file size manageable. For example, each tile might be no larger than 1500×1500 pixels. The tiles, when joined together, will cover the historical survey area, but can also cover a much larger area than a historical survey area.

Figure 6A:
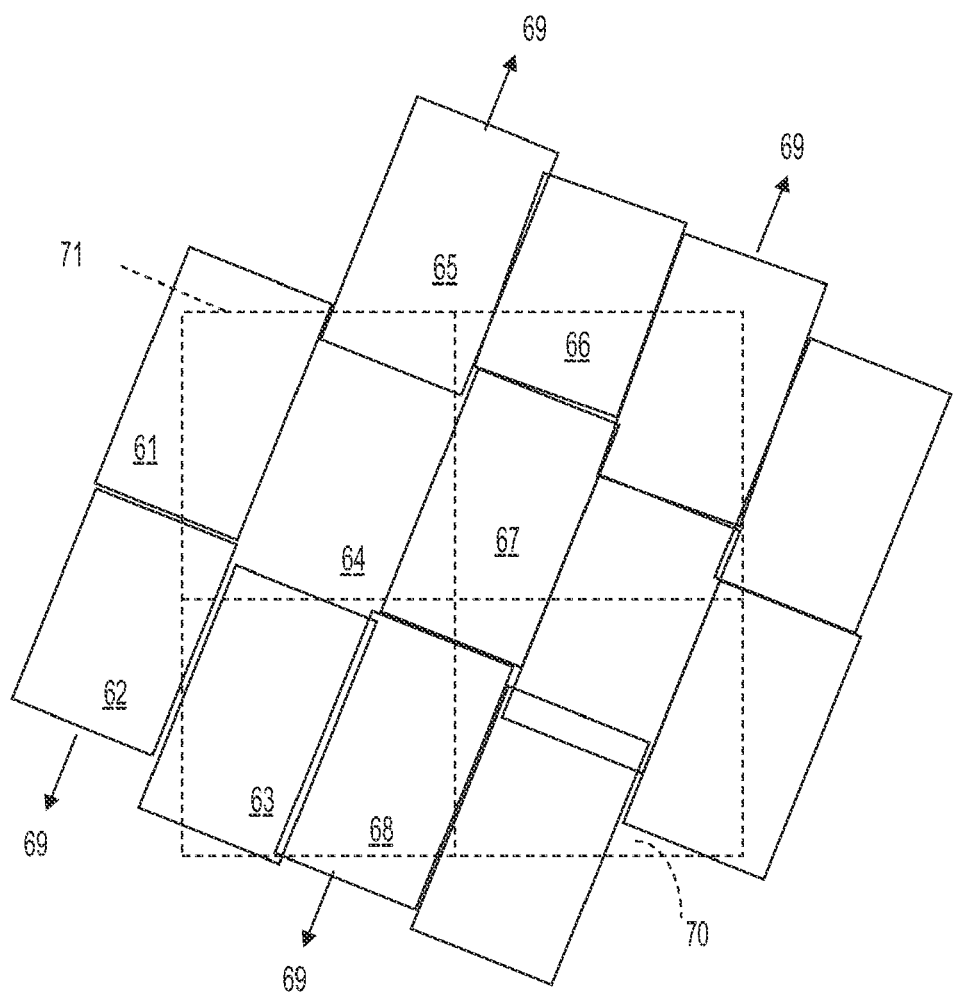
FIGS. 6A and 6B illustrates time based UNISIPS data files overlaid with area based tiles.
Figure 6B:
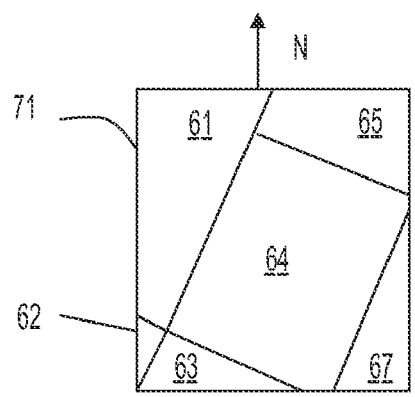

FIG. 6A illustrates an example of group of tiles 70 overlaid over the historical time-based UNISIPS files 61-68 that correspond to the path of a historical survey. The heading of the survey for file 62 is along the direction 69. As seen in FIG. 6B, the data from files 61, 62, 63, 64, 65, and 67 all contribute to the tile 71. The tiles are oriented with their upper edge facing north.

This tiling method produces unique, variable-sized, repeatable tiles at the same resolution as the time-based sonar imagery. The tiles do not overlap and can be defined for the entire world. The results of the tiling of the historical imagery are many tiles of differing Q values, that when knitted together produce an area-based "view" of the historical imagery.

Displaying the Historical Imagery

During the change detection survey, the system displays both the real-time side scan sonar imagery and the historical imagery side by side for an operator. The historical display is updated based on the geographic position of the new imagery and the sonar heading in the new imagery. The update rate can vary based on the acquisition rate of the new sonar imagery. For example, a suitable update rate for the historical display can be every 30 new-imagery scanlines, or faster or slower, depending on the speed of the survey vessel.

In an exemplary embodiment, the system accomplishes these steps in order to update the historical display:

1) Based on the new imagery's LAT/LON position and heading, the LAT/LON extents of the entire historical display are computed. The extents are the LAT/LON values of the four corners of the display.

2) From the LAT/LON extents of the display, the minimum and maximum tile rows and columns are computed. The system determines which tiles are geographically inside the display extents.

3) Each of the tiles within the extent of the display is then processed individually. All samples within the tile are "rotated" to match the new imagery heading and are displayed on the historical display (if the sample's new rotated LAT/LON position falls within the display extents).

Often, there is more than one historical survey of the same seafloor area, because an area is repeatedly surveyed for mines or other objects. In this situation, the historical imagery display can be a combination of tiles from the previous surveys, to provide a better image of the seafloor. For example, the display might include only data from the first survey, except in areas when the Q value is low (0 or 1). In those areas, imagery from later surveys with higher Q values would be displayed. Alternatively, imagery from the most recent survey can be displayed, except in low Q regions, where earlier survey imagery with higher Q values would be displayed. The tiles from different historical surveys can be combined in other ways. For example, the sample values from different surveys can be averaged, with the average displayed on the historical screen, or the sample values can be weighted with the Q value and combined. In addition, because surveys occasionally miss a swath of seafloor, if the most recent historical survey missed some of the seafloor, the historical display can fill in that area with the samples from tiles of another. In an exemplary embodiment, the historical display can include snippets of previously identified possible contacts from more than one historical survey. In another embodiment, if a feature has been previously identified in more than one survey (and thus, is found in more than one UNISIPS file), the feature that is closest to the position of the feature in the new imagery is shown.

FIGS. 7A and 7B illustrate the displays schematically. As the vessel moves forward through the survey track, new scanlines 91 appear at the top of the change detection survey display screen 90 and the older scanlines 92 disappear from the bottom of the screen.

The historical display 100 is georeferenced or "co-registered" to the center sample of the newest scan line. That is, the historical display follows the LAT/LON and heading position of the side scan sonar. The historical display will therefore show the historical imagery for the same geospatial region. The sample values from the area-based tiles are moved and rotated as necessary to match the position and the headings of the change detection sonar imagery. Note that in an exemplary embodiment, the historical display "leads" the change detection survey display by some distance on the screen. This feature allows the operator to see a historical feature on the historical display before it is expected to appear on the change detection survey display. For example, in FIG. 7B, the historical gravel feature 108 appears before the corresponding gravel feature 98 in the change detection survey display 90.

As potential contact features 93 move from the top toward the bottom of the change detection survey display screen, they pass a line 94 positioned at a fixed location from the top of the display screen. A line 104 corresponding to the same (estimated) LAT/LON position is also shown on the historical display so the operator can easily correlate the displays. Once the possible contact feature has passed the line 94, the operator can use the mouse or other input device to tag the feature as a possible contact. The software system will then perform several operations. The software system will draw a box around the possible contact on the screen and will display the view of the possible contact as a snippet in one of seven positions 95 at the bottom of the larger display. The software system can also use the other modules to see whether the selected feature is within a preset size range and whether the selected feature matches a contact from the historical survey data. If the user is unsure whether a feature should be classified as a new contact, the operator uses the mouse or other user input device to tag the feature, and the software sends the information to a quality control operator for a final determination.

The system also automatically performs identification of new features and change detection on the side scan sonar imagery without any user input needed.

The first display 100 of historical side scan imagery runs a software application that displays historical SSI over the same geographic area (co-registered) as the new survey SSI collected in RT and displayed in the RT GUI. The location of known contacts (i.e., features seen in previous surveys) are plotted in white over the historical SSI, along with the geographic location of the current survey's sonar. As the sidescan approaches the location of known contacts, the historical contacts automatically pop-up on the same display. The white historical contact markers turn green when the object has been either manually or automatically observed in the SSI from the new survey. The historical contact markers can be a box surrounding the contact, or another visible type of marker.

The first display of historical side scan imagery 100 requires almost no operator interaction. By simply monitoring the displays, the analyst can track where the sonar is in relationship to the historical SSI, which historical contacts are close by, what they looked like in the past, and if they have been observed in the new SSI.

The second display 90 runs the new real time graphical user interface application developed to display side scan imagery from the new survey as it is being played back in real time. The CAD and Completion algorithms run on the side scan imagery as it is being displayed. When the algorithms detect a new feature, the CAS algorithm queries the master contact database (MCDB) to determine if any historical features are spatially close. If so, the new contact and the historical contact(s) are sent to the feature matching algorithm, which attempts to determine if the new feature is one of the historical features. If so, the real time operator will be prompted to verify the match. If no match is found, the real time operator will look at the historical display 100 and attempt to manually match the new contact with a historical contact. The corresponding historical feature marker in the historical display 100 will turn green if either method produces a match.

If anytime during the collection and displaying of new SSI the real time (RT) operator sees a contact in the new SSI that was not detected by the advanced change detection system, the RT Operator can click on the contact in the display, at which point the system will attempt to complete the object, search the database, and perform the match. The RT operators can also perform the match manually as described above. As described before, all resulting matches will turn green on the historical display 100.

Figure 8A:
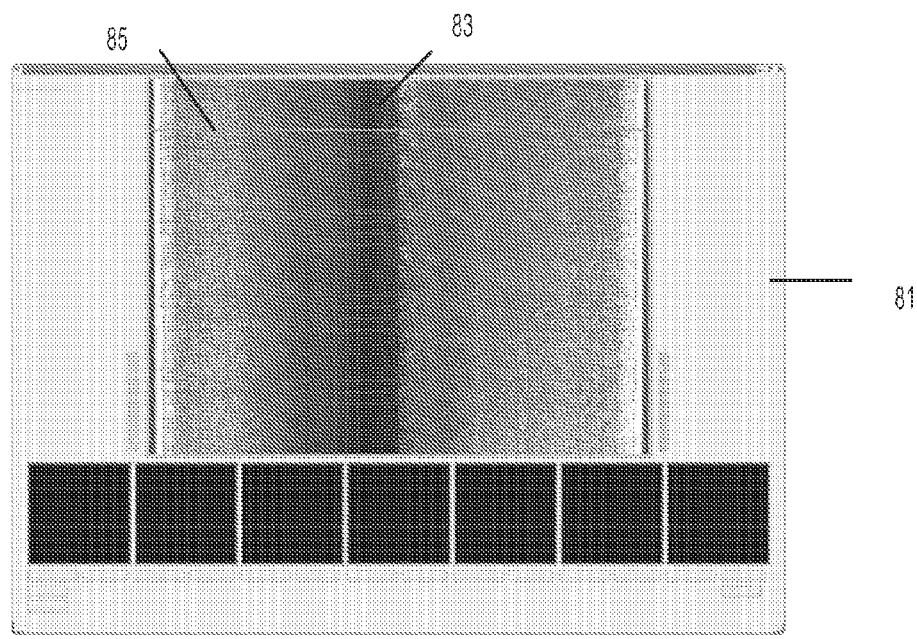
FIG. 8A-8J illustrate features of the historical and change detection survey displays in accordance with an embodiment of the invention.
Figure 8B:
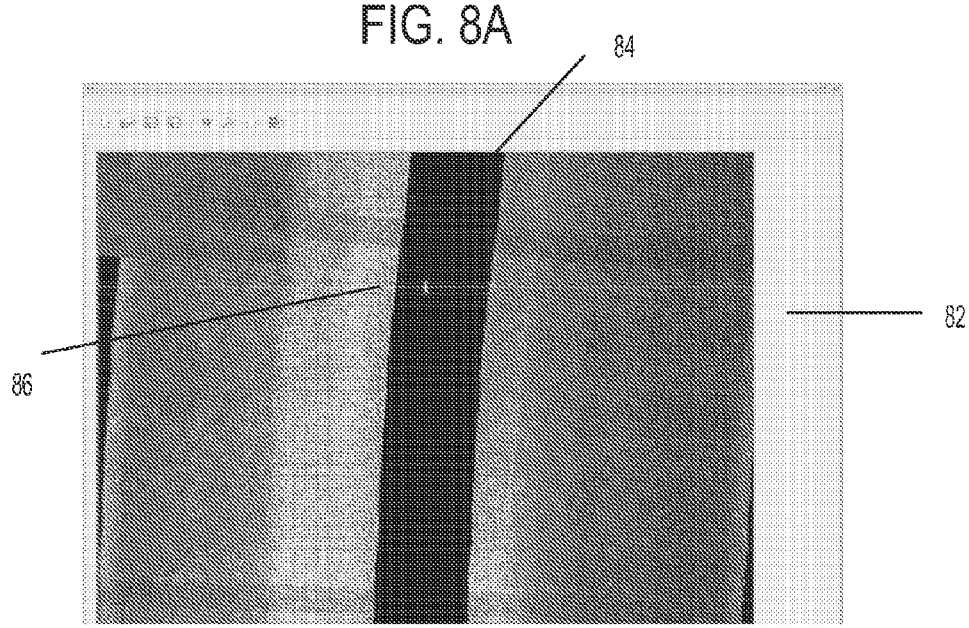

Newly detected features that do not match either manually or automatically are provided to a second operator, the quality control operator (QC Operator), for further verification. The QC Operator performs manual change detection between new and historical SSI. If the QC operator does not observe the contact in the historical data, the system marks the contact as a new feature. A new feature is a feature that appeared or was placed in the survey area after the previous historical survey. FIGS. 8A and 8B are real time (change detection survey) and historical imagery displays, respectively. Note that the nadir 83 under the side scan sonar appears in the change detection sonar display 81, and that the historical imagery display in FIG. 8B also shows a nadir 84, indicating that the historical tiles do not include data for the nadir area. As seen by the relative position of the horizontal registration lines 85 and 86 on the real time and historical displays, the historical display "leads" the change detection survey display by some distance on the displays. The scanlines between the top of the waterfall display and the red registration line 85 are processed by the software to detect objects. In order to allow the software time to process the information above the registration line 85, the system only allows the user to select an object once the object has moved or "scrolled" below the red registration line 85. The user cannot select objects above the registration line 85.

Figure 8C:
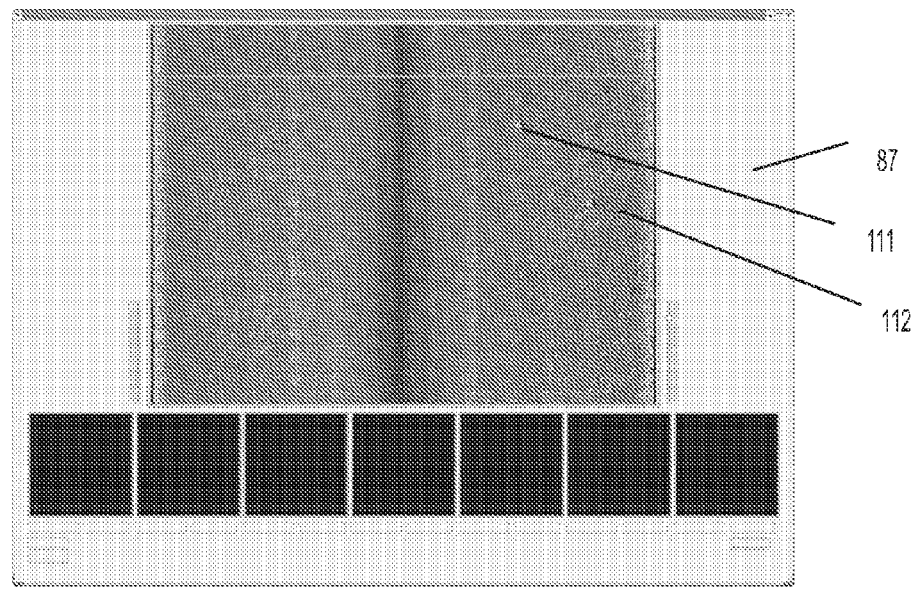
Figure 8D:
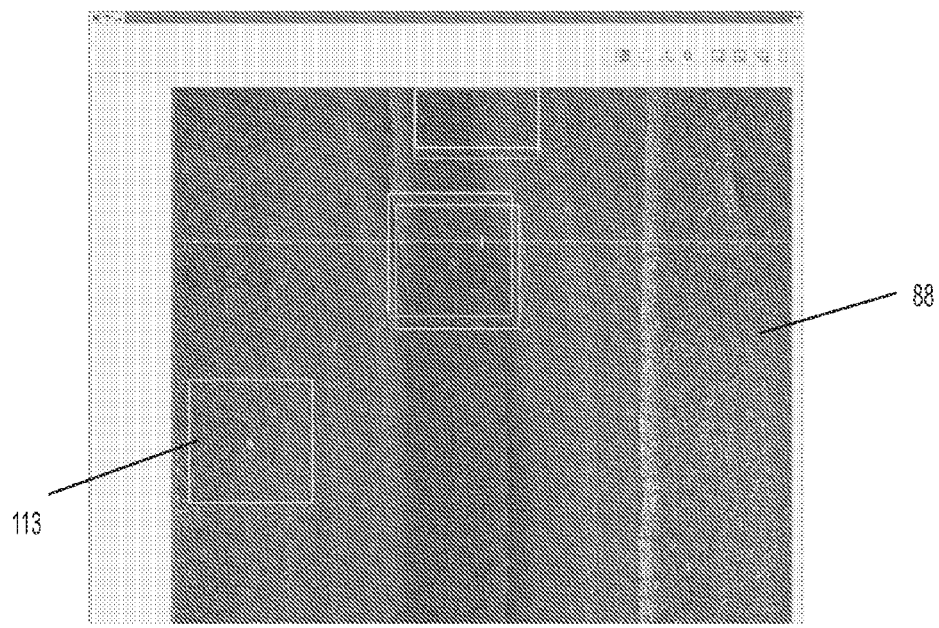

FIGS. 8C and 8D illustrate real time (change detection survey) imagery 87 and historical imagery 88 displays, respectively, before a user selects objects 111 and 112 for processing. Note that in FIG. 8D, the historical imagery shows several previous contacts, each surrounded by a white square box 113.

Figure 8E:
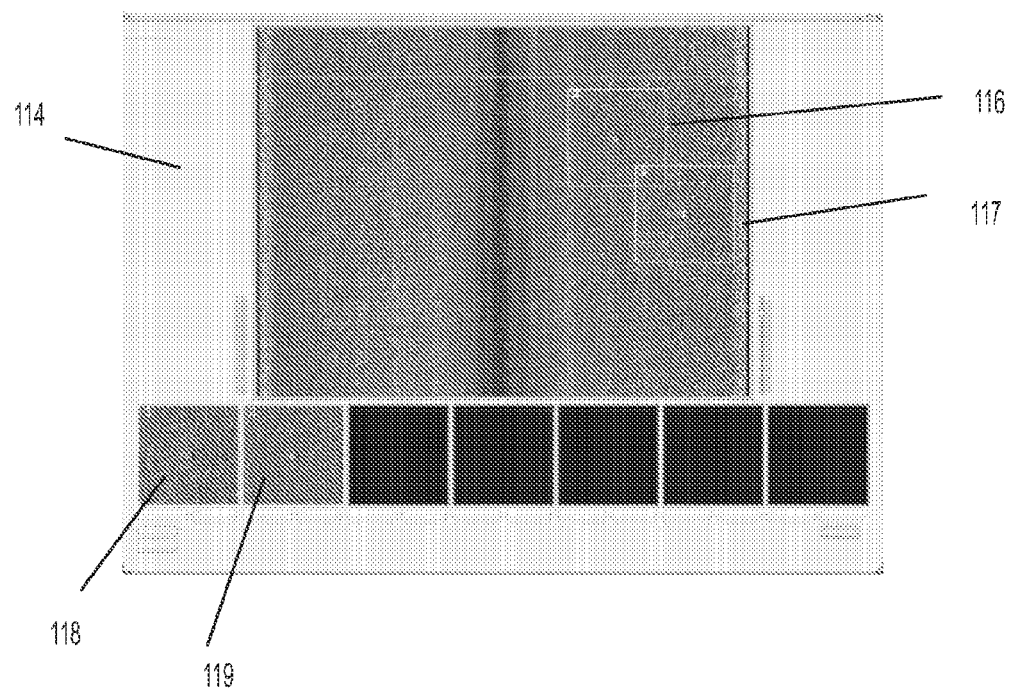
Figure 8F:
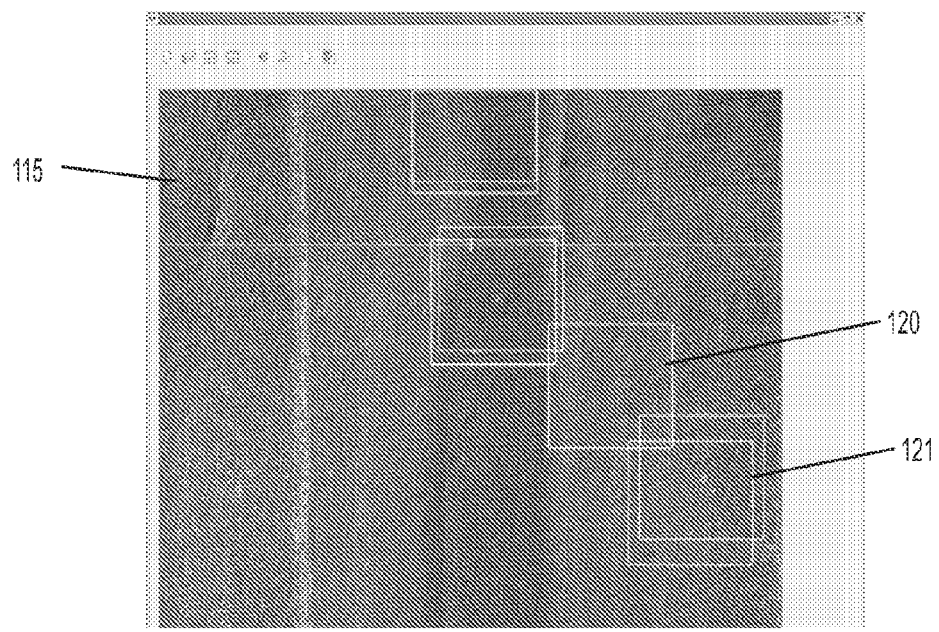

FIGS. 8E and 8F illustrate real time (change detection survey) imagery 114 and historical imagery 115 displays, respectively, after the operator selects objects 111 and 112 for processing. Yellow boxes 116 and 117 appear around each object in the change detection survey display. Views 118 and 119 of the objects appear at the bottom of the main change detection survey display. Yellow boxes 120 and 121 appear at the same geospatial location in the historical display, so the operator can compare the images.

Figure 8G:
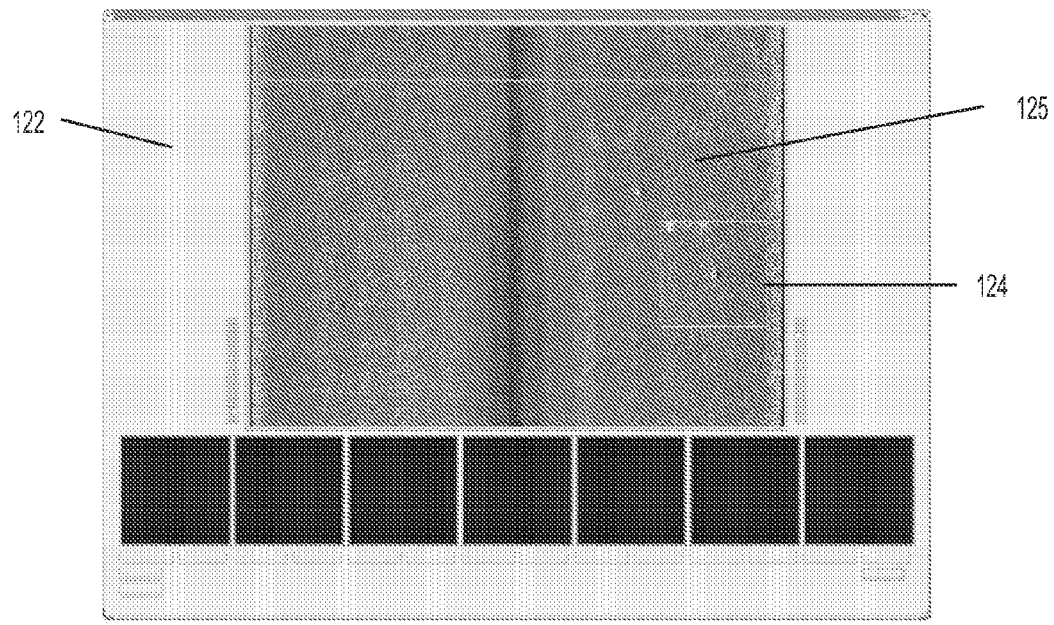
Figure 8H:
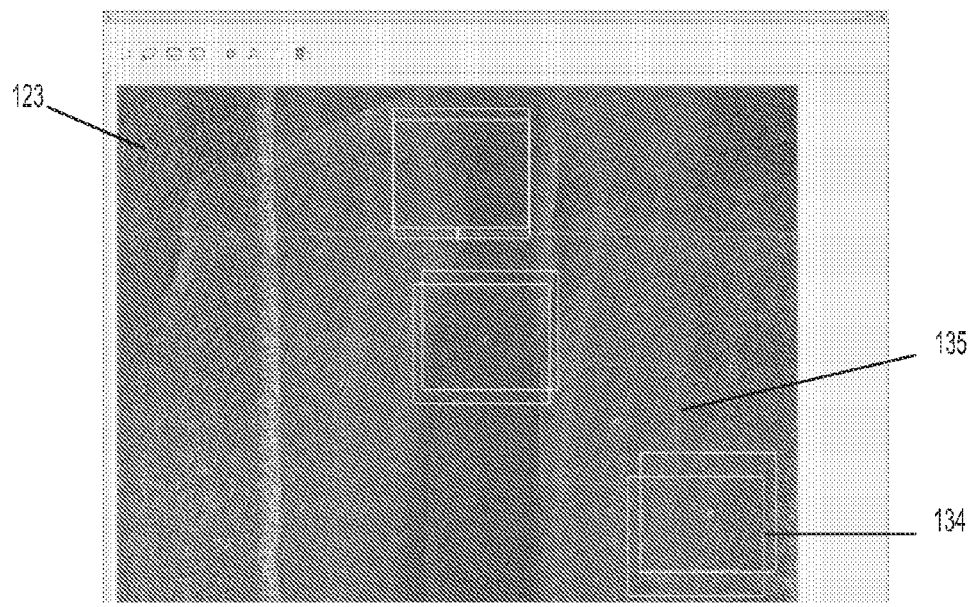
Figure 8I:
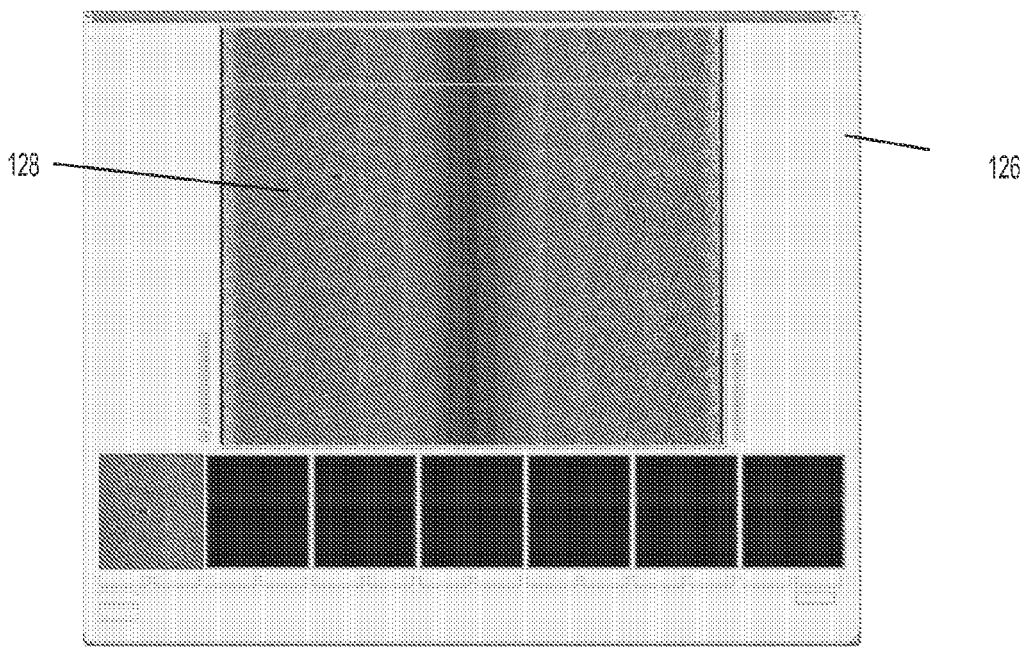
Figure 8J:
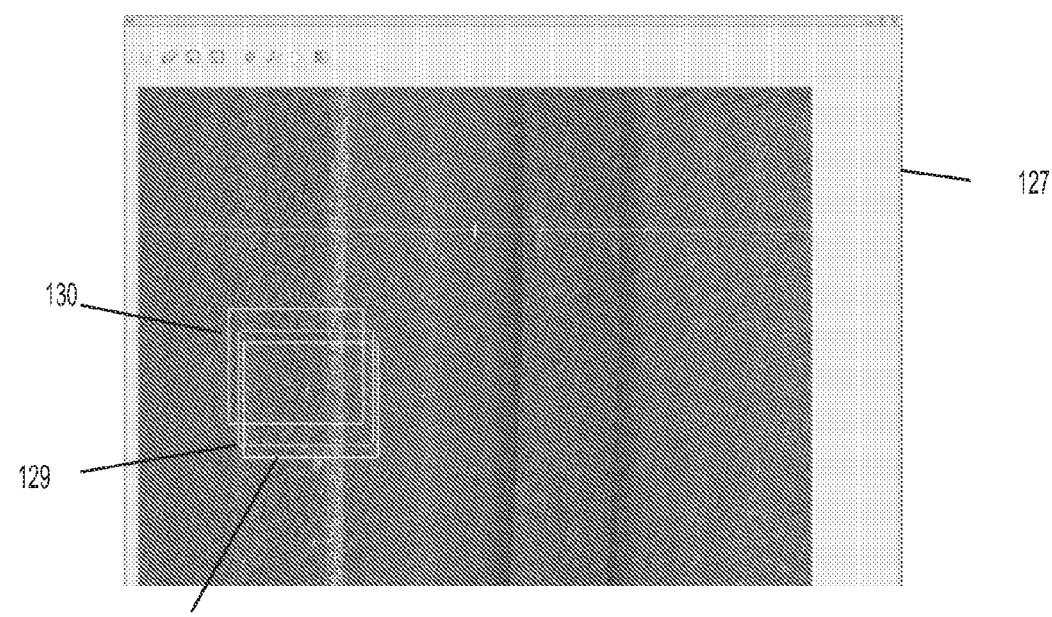

FIGS. 8G and 8H illustrate real time (change detection survey) imagery 122 and historical imagery 123 displays, respectively, after the system processes the operator selected object. The yellow boxes change color to indicate the disposition of the object. The green boxes 124 and 134 indicate that a visual match was made for the object in the box. The red boxes 125 and 135 indicate that the object in that box was sent to quality control for further processing. FIGS. 8I and 8J illustrate real time (change detection survey) imagery 126 and historical imagery 127 displays, respectively, illustrating an object auto-detected by the ACDC computer system. The blue box 128 around the object in the real time display indicates that the system's CAD module detected the clutter (object) and determined that the object met the size and shape parameters. The blue box 129 in the historical display is positioned at the same LAT/LON as the blue box in the real time display. The white boxes 130, 131 in the historical display indicate that contacts were found in earlier surveys, with the object information stored in the UNISIPS file.

For the real time display, if an object is detected automatically by the ACDC software, it is tagged yellow. If the software also finds a matching object in the historical database, it is then turned blue. If the user clicks on an object that has not been detected by the ACDC software, it is tagged yellow and the software searches the historical database for a matching object. If a matching object is found, it is then tagged blue. The user can then check the historical display, whether the object is tagged yellow or blue. If the user determines that the tagged object matches an object on the historical display, the user selects a "Visual Match" button below the snippet image at the bottom of the real time display graphical user interface (GUI). The object is then tagged green. Otherwise, the user can select "Send to QC", which then sends the snippet to the QC computer and tags the object red. If no action is taken by the user and the object scrolls off the bottom of the screen, the object is automatically tagged red and sent to QC.

Objects that appear on the historical display that are already in the historical database are tagged white. The system also sends the coordinates, heading, and tag color of any objects that are tagged on the real-time display to the historical display. This allows the user to easily determine whether a detected object was previously detected or is a new object.

Figure 9A:
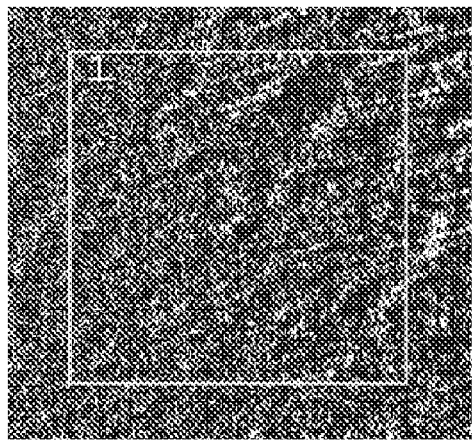
FIGS. 9A and 9B illustrate views of historical and change detection survey imagery of a contact.
Figure 9B:
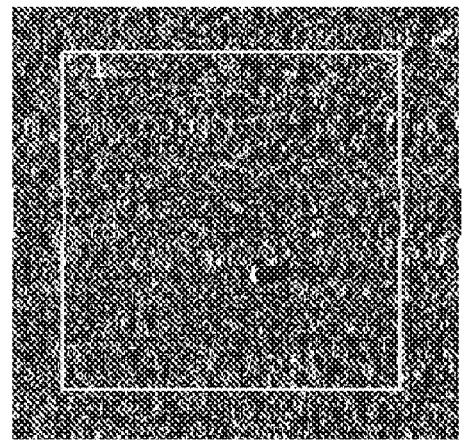

FIGS. 9A and 9B illustrate views of historical and change detection survey imagery of a contact.

Additional details of exemplary clutter detection, completion, computer aided search, and feature matching modules are as follows.

Detection

The computer aided clutter detection (CAD) module distinguishes between clutter (objects in the water column or seafloor). The CAD module utilizes geospatial bitmaps to run in real time one scanline at a time. This CAD algorithm detects and extracts snippets from historical and recently collected SSI so comparisons can be made later.

The real-time automated detection algorithm ingests one UNISIPS scan line at a time. Across-track bright and shadow positions, lengths, and intensity information are immediately gathered from the scan line and stored in two one-dimensional geospatial bitmaps (GBs): one for shadows and one for brights. A circular lookup table is created to "window" the imagery, several scan lines at a time. This lookup table is the same width as the GBs and is populated with the positions and run-lengths of shadows and brights stored in the GBs. The window is used to make the final detection decision and is described in the "Detecting Objects" section of this paper.

Simple bitmaps—with a depth of one bit per pixel—are binary structures in which bits are turned on (set=1) or off (cleared=0). The index of each bit is unique and denotes its position relative to the other bits in the bitmap. In this algorithm, every bit represents an object at some unique geospatial location. A set bit indicates that some object of interest exists (in this case a bright or shadow pixel) at that location, accurate to within the resolution of the bitmap. A cleared bit indicates the absence of any object at that location. Although a geospatial bitmap can be defined for an entire finite space, memory is only allocated—dynamically—when groups of spatially close bits are set, resulting in a compact data structure that supports very fast Boolean and morphological operations.

Traditionally, thresholding has been performed on an entire image, a process often called posterization, where select pixels, representing the foreground, are set to black and all other pixels (the background) are set to white to produce a binary image. The threshold is typically chosen in one of two ways: 1) ad hoc based on a histogram, or 2) interactively by a human after the entire image has been equalized. Neither approach is suitable for real-time, automatic detection described herein.

In an exemplary embodiment, two thresholds are used to capture both bright regions (brights) and shadows. Shadows and brights are located in a scan line by first determining a lower intensity bound, $i_{min}$, in which all samples of intensity lower than $i_{min}$ are considered shadows. Likewise, an upper intensity bound, $i_{max}$, is found in which all samples of intensity that fall above $i_{max}$ are considered brights. These intensity bounds are determined for each scan line, minus the center 10% of pixels, which are located close to nadir where the SSS is blind.

The minimum and maximum intensity values, $m_{min}$ and $m_{max}$, are also determined for all pixels in the scan line, minus the center 10%. If $m_{max} < 128$, the scan line is considered too dark to contain any suitable brights, and thus the entire scan line is ignored. This can greatly reduce processing time. If the scan line is not ignored, the mid-range value, $m_{half}$ is computed by:

$$m_{half} = \frac{m_{max} - m_{min} + 1}{2}.$$

If intensity values for each line (and thus, the entire UNISIPS file) are normally distributed with a range of 0 to 255, the thresholds, $i_{min}$ and $i_{max}$ can be chosen as the first and third quartiles of the distribution. For example, $i_{min}$ could be chosen as 256/4=64 and $i_{max}$ as 3(256)/4=192 for the entire file. However, the intensity varies with range (more rapidly closer to nadir) partly because the time-varying gain (TVG) function is imperfectly matched to the environment and the system. The TVG function is applied during transducer amplification in an attempt to keep the average output power approximately constant. The intensity can also be affected by the sonar frequency, substrate slope, micro-scale roughness, and surface composition and density. The distribution also tends to be skewed toward lower intensities. Traditionally in image processing, a gamma shift is used to stretch skewed distributions, maximizing the ability of the human eye to detect individual differences in the intensities. In practice, a lookup table is created experimentally, based on actual measured intensity values. The use of this lookup table to approximate a gamma shift (which improves processing speed) is known as a gamma correction. An appropriate gamma shift will convert the intensities of the image to fit a normal distribution, such that $i_{min}$ and $i_{max}$ could be set to the quartiles of the shifted normal distribution. Since the distribution of intensity values is different for each scan line, the gamma correction would also be different for each scan line. However, performing a gamma correction on every scan line to calculate intensity thresholds can be too computationally intensive to support a real time application.

In an exemplary embodiment, the computer aided detection module maps the ideal $i_{min}$ and $i_{max}$ values from the standard normal distribution to the actual distribution via an approximation of the inverse gamma function, based on statistical measurements of each scan line's intensities. In other words, only two values ($i_{min}$, $i_{max}$) are mapped for each scan line, rather than 90% of the scan, according to the equations $i_{min} = Am_{half} + \sigma^2 r$ and $i_{max} = 256 - Bm_{half} + \sigma^2 r^{-1}$, where the value 256 in the $i_{max}$ equation is the largest intensity value possible. The mean, $\mu$, and variance, $\sigma^2$, are computed from all pixels in the scan line minus the center 10%. A single pass variance calculation, used by some hand-held calculators, is used to improve processing speed:

$$\sigma^2 = \frac{1}{n-1}\left(\sum_{i=1}^{n} X_i^2 - \frac{\left(\sum_{i=1}^{n} X_i\right)^2}{n}\right).$$

The r can be thought of as a percentile shift from the mean according to the equation $r = m_{half}/\mu$. A and B can be experimentally determined values through direct testing that allow the automated clutter algorithm to achieve a probability of correct detection ($P_c$) of at least 90% on ground truth data sets. As A and B increase, the $P_c$ and the probability of false alarms ($P_{fa}$) both increase. Experiments have determined suitable values for A and B to be A=0.292 and B=1.480 for side scan sonar imagery, although other values may also be appropriate for different imagery types.

After $i_{min}$ and $i_{max}$ have been determined for scan lines with $m_{max} \geq 128$, the port and starboard halves of the scan lines are processed separately. (Note that the center 10% of the scan line is retained for this process.) Each half of the scan line can be represented by a vector, X, of length N. The following method is used to process shadows and brights for the starboard side; the port side is processed similarly.

Figure 10:
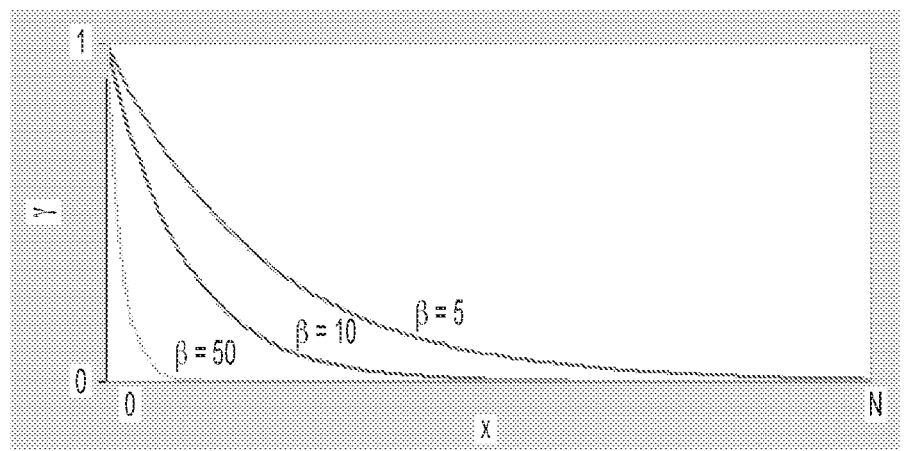
FIG. 10 is a graph illustrating thresholding characteristics for use in the computer aided detection module in accordance with an embodiment of the invention.

Two GBs of size 1×N are created, one for shadows and one for brights. A different gamma adjustment, $\gamma$, based on an error approximation of SSS parameters, is computed for position x within X as $\gamma = e^{-\beta x/N}$, where $\beta$ is based on the sonar parameters such as time varying gain. As seen in FIG. 10, as $\beta$ approaches infinity, the gamma correction approaches 0 over a greater range of X, and therefore has less affect on the intensity thresholds.

Figure 11:
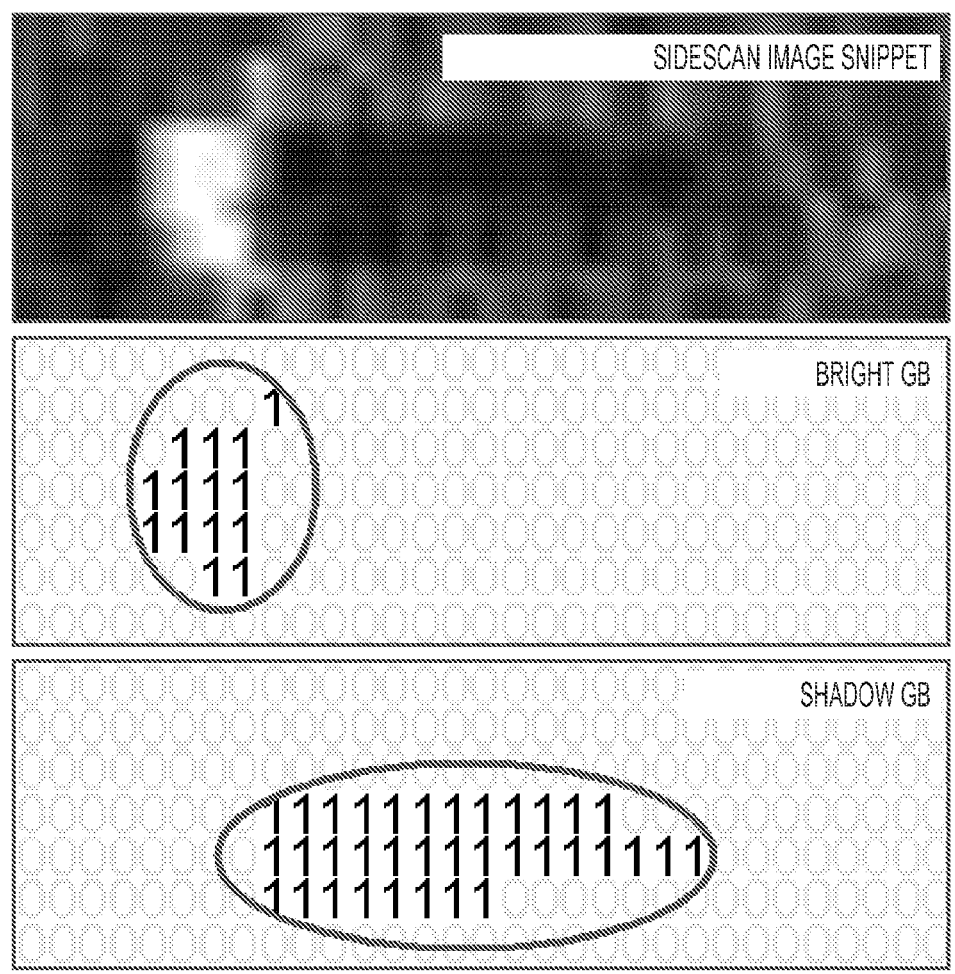
FIG. 11 illustrates brights and shadows for a contact.

The bright and shadow thresholds $I_{max}(x)$ and $I_{min}(x)$ are defined as $I_{max}(x) = i_{max}(1+\gamma)$ and $I_{min}(x) = i_{min}(1-\gamma)$. All pixels with intensity values above $I_{max}(x)$ are considered brights, while all with intensities below $I_{min}(x)$ are considered shadows, and the corresponding bits in the bright and shadow GBs are set, as seen in FIG. 11. GBs are used to facilitate clutter detection of objects in SSI. Each row of bits in both GBs corresponds to a single scan line in the image.

Figure 12:
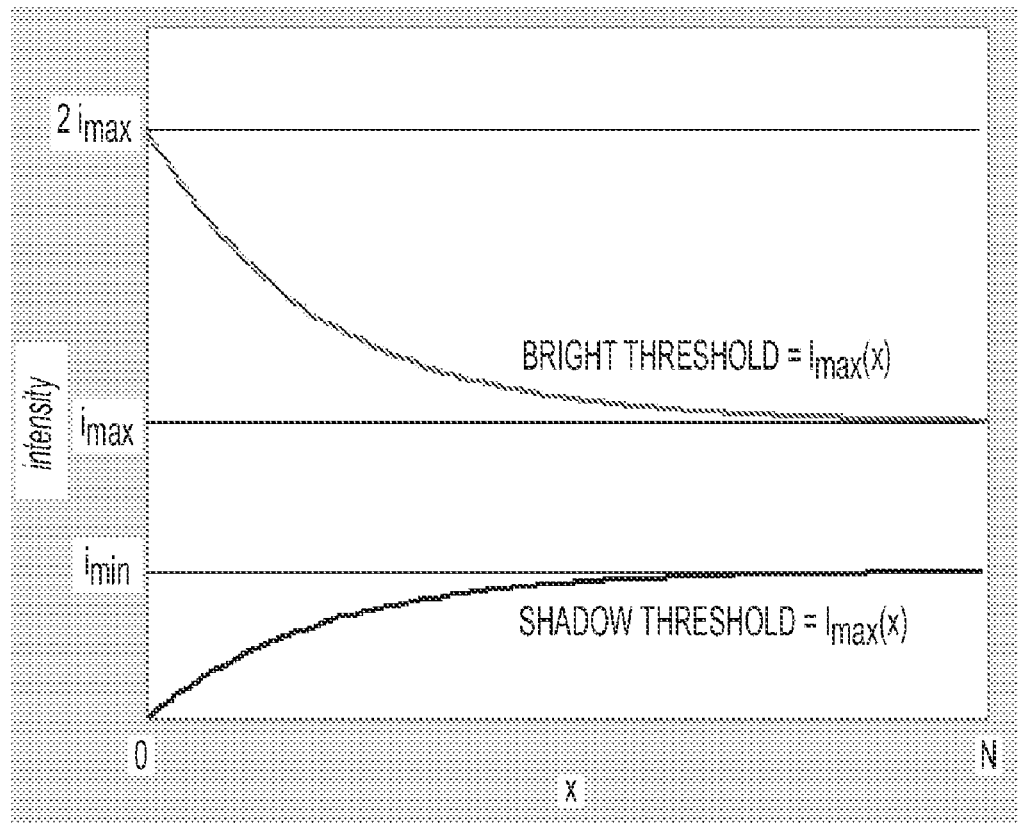
FIG. 12 is a graph illustrating thresholding characteristics for use in the computer aided detection module in accordance with an embodiment of the invention.

FIG. 12 illustrates how the intensity thresholds vary over x for a given γ. For example, the closer a pixel is to nadir (x=0), the greater its intensity must be to be detected as a bright, and the lower its intensity must be to be detected as a shadow. Note that two threshold curves do not diverge from their respective asymptotes ($i_{min}$ and $i_{max}$) at the same rate as they approach nadir, because shadows are more detectable than brights in side scan imagery. In other words, a single shadow threshold value ($i_{min}$) suffices for more values of x than a single bright threshold value ($i_{max}$).

In order to detect clutter (possible objects on the seafloor), the bright and shadow geospatial bitmaps are then examined from the outer edges of scan lines toward nadir to detect runs of shadows followed by runs of brights. A valid object will have a shadow that falls away from nadir, with an adjacent bright closer to nadir. A summary of the steps to be performed to detect clutter is as follows:

1) Search the shadow GB (one scan line at a time, from the edge toward nadir) for a set bit. This is the shadow's start bit.

2) Continue examining both GBs to determine the end of the shadow. The concept of momentum is used here to allow some cleared bits to be considered part of the shadow (described below).

3) Determine whether the length of the shadow is consistent with the size of an object of interest. Specifically, shadows with lengths that fall within desired object height ranges—considering the distance from nadir, SSS height above seafloor, across-track resolution, and across-track error—are maintained in the shadow GB.

4) Search for a set bit in the bright GB (starting at the bit index corresponding to the end of the shadow). This is the start bit of a bright.

5) Continue examining both GBs to determine the end of the bright (again using momentum).

6) Determine whether the combination of the bright and shadow runs is consistent with an object's allowable size, given the parameters outlined in step 3.

7) Translate the detected object's start bit and length into a 2D sliding window that will contain a summary of possible single-scan line object detections, which are examined to determine whether they are consistent with along-track object dimensions.

8) Repeat steps 1-7 for all shadows and brights detected in the scan line.

9) Examine the sliding window to determine whether the previous series of scan lines defines an object.

Steps 1 through 9 are repeated for each scan line.

Figure 13:
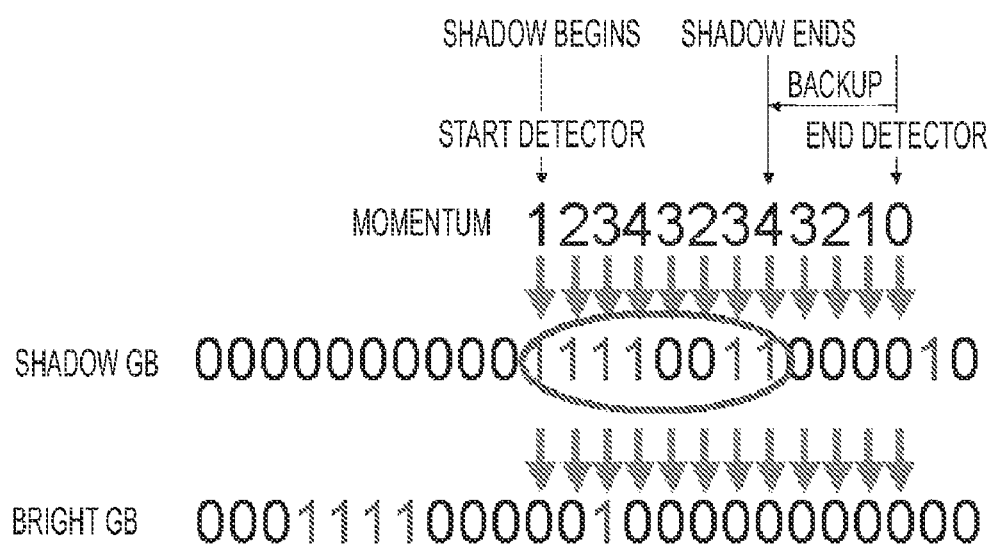
FIG. 13 illustrates the use of momentum to determine how many cleared bits to include in a bright or shadow in a computer aided detection module in accordance with an embodiment of the invention.

The term "momentum" describes a set of rules that govern how the configuration of set and cleared bits within the two GBs defines a run of brights or shadows. Momentum can be used to determine how many cleared bits to include in a shadow or bright GB. In the case of a shadow run, the first set bit in the shadow GB defines the start of a new run, at which point momentum is set to 1. Each subsequent set bit in the shadow GB increases momentum by 1, while a cleared bit decreases momentum by 1. When the momentum returns to 0, the last set bit encountered in the run defines the end of the shadow. For example, in FIG. 13, momentum reached 0 four bits after the last set bit in the shadow run. The four clear bits are not included as part of the shadow.

One exception to these rules is that a cleared bit in the shadow GB cannot be included in the current run if the bright GB contains a set bit at that location. In other words, even if momentum has not yet reached 0, the run is terminated and the shadow is considered complete (minus any ending clear bits, as described above).

The process is repeated until the end of the scan line is reached. Momentum is used in the same manner to define bright spots in each scan line.

Generating Snippet in the Mini-UNISIPS (MU) Format: When the algorithm detects clutter, the scan line and the center of the object (defined here as the center of the bright spot) are recorded. The center point is expanded out by some preset value (e.g., 10 meters) on all sides and a snippet is created. The snippets are saved in the same UNISIPS format, called mini-UNISIPS, or MUs.

The latitude and longitude (LAT/LON) position of the object's center can be computed with a great circle calculation, given the LAT/LON position of nadir for the scan line, the distance (in meters) from nadir to the center of the object, along-track and across-track resolutions, and the heading of the SSS at the time the line was collected.

The clutter detection module was evaluated using a copy of UNISIPS data along with the locations of 48 clutter objects. The table in FIG. 14 shows the $P_c$ verses $P_{fa}$ from 25 runs of the automated clutter detection algorithm using these UNISIPS files while adjusting parameters A and B, which control how the lower and upper shadow/bright thresholds are computed.

Figure 16:
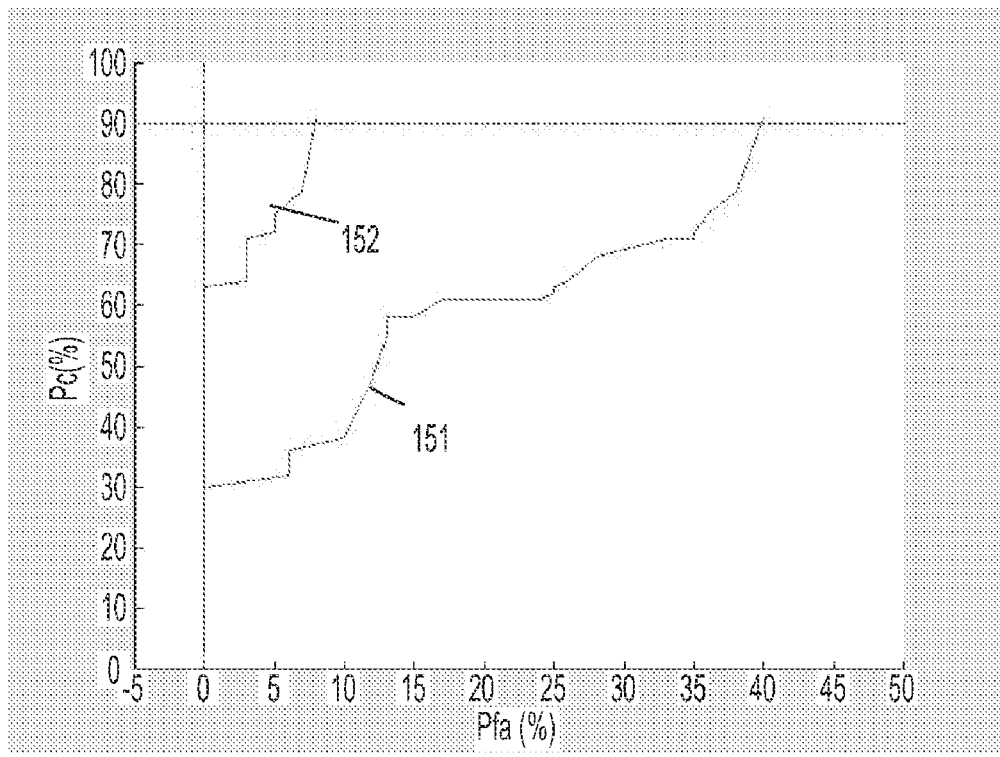

The completion module (CM) was used to reduce the $P_{fa}$ for the UNISIPS data files. CM adaptively filters each snippet produced by the detection stage into an image with only three intensity values: black (for shadows), white (for brights), and gray for everything else. The algorithm determines whether the snippet actually contains a shadow, and if so, the shadow is used to "complete" the bright spot. If no shadow exists, the snippet is flagged as a false alarm. FIG. 14 shows the $P_c$ and $P_{fa}$ results for the automated clutter detection algorithm. FIG. 15 shows the $P_c$ and $P_{fa}$ results for the automated clutter detection algorithm in combination with the completion module. In FIG. 16, the curve 151 is the $P_c$ vs. $P_{fa}$ curve for the automated clutter detection system. A $P_c$ of 90% was obtained, but the $P_{fa}$ was high (roughly 40%). The curve 152 is the Pc vs. Pfa curve for the combination of the automated clutter detection algorithm and the completion module. A high $P_c$ was achievable (over 90%) while maintaining a low $P_{fa}$ (roughly 9%).

Completion Module

Figure 17:
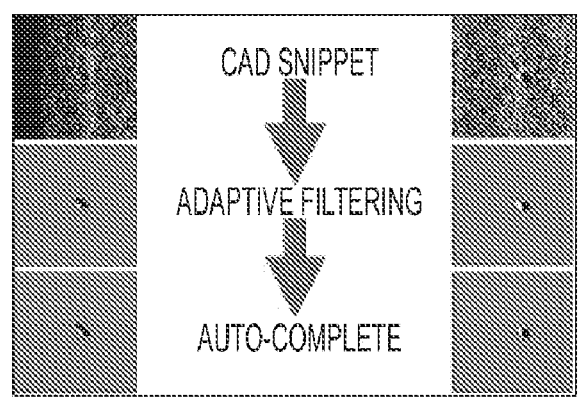
FIG. 17 shows an example of two snippets produced by the CAD algorithm.

In the completion module, the snippets from the change detection module are sent to a classification stage where the completion algorithm attempts to determine if the snippet contains a mine-like contact. The completion algorithm is configured to determine attributes such as size and shape of the contact based on the size and shape of the bright spots and adjacent shadows, sonar altitude, sonar resolution, and distance from the nadir. The algorithm then computes a confidence measure. If the contact has a high enough confidence measure, the system designates a contact. When the confidence measure falls below a set threshold, the system prompts the operator to make a final judgment, and allows the operator to designate the snippet as containing a contact. FIG. 17 shows an example of two snippets produced by the CAD algorithm. The completion algorithm filters the snippet and extracts the shadow. The algorithm then uses the shadow to "complete" the bright spot based on known information such as sonar altitude and the contact's distance from nadir.

Note that the displays of real time and historical side scan sonar images show the operators imagery without processing by the completion algorithm.

Computer Aided Search Module

After the completion module or the operator has designated a contact, the location of each completed contact is then passed to a computer aided search (CAS) algorithm. The CAS algorithm queries the Master Contact Database and finds all the historical contacts that are "spatially close" based on an estimate of position error. The CAS algorithm uses geospatial bitmaps and a modified quadtree structure to accurately and efficiently perform geospatial searches.

Using geospatial bitmaps and a modified quadtree structure overcomes a major problem with previous post-classification change detection schemes due to the inaccurate geometric registration between the two images that results from inherent position error of the side scan sonar.

Trees are naturally efficient at representing hierarchical data, particularly well suited to the implementation of databases, and allow for the quick retrieval of data items based on spatial location. Rooted trees are comprised of a set of nodes (vertices) and a set of arcs (edges) that link a parent node to one of its child nodes. Each root node has one parent. Any node can be reached by following a unique path of arcs from the root. When vertices are interconnected, the tree is considered bi-directional.

Binary trees are the simplest kind of tree, in which each parent node has at most two children. Binary trees and hash tables are most useful for one-dimensional (1D) data. Two-dimensional (2D) data, such as maps and feature data, are better stored in quadtrees. A quadtree is similar to a binary tree, but parent nodes have at most four vertices.

Because the CAS algorithm needs to store and retrieve 2D geographical data, the quadtree data structure was chosen as the starting point in the design of the CAS algorithm. To improve efficiency and speed of retrieval, the CAS algorithm uses a combination of geospatial bitmaps and quadtree to create a new data structure called a MTREE, which allows for storage and quick retrieval of the locations and related attributes of historical SSI features.

Bitmaps are 2D binary structures, in which bits are turned on (set) or off (cleared) and the row and column of each bit gives it a unique position. This concept is extended to construct GBs, in which each bit represents a unique location on the Earth at a given map scale. A set bit denotes that data exists at that location, while a cleared bit indicates the absence of any data at that location. Although a GB is defined for the entire world at a given map scale, memory is only allocated dynamically as groups of spatially close bits are set, resulting in a compact data structure that supports very fast Boolean and morphological operations.

Figure 18:
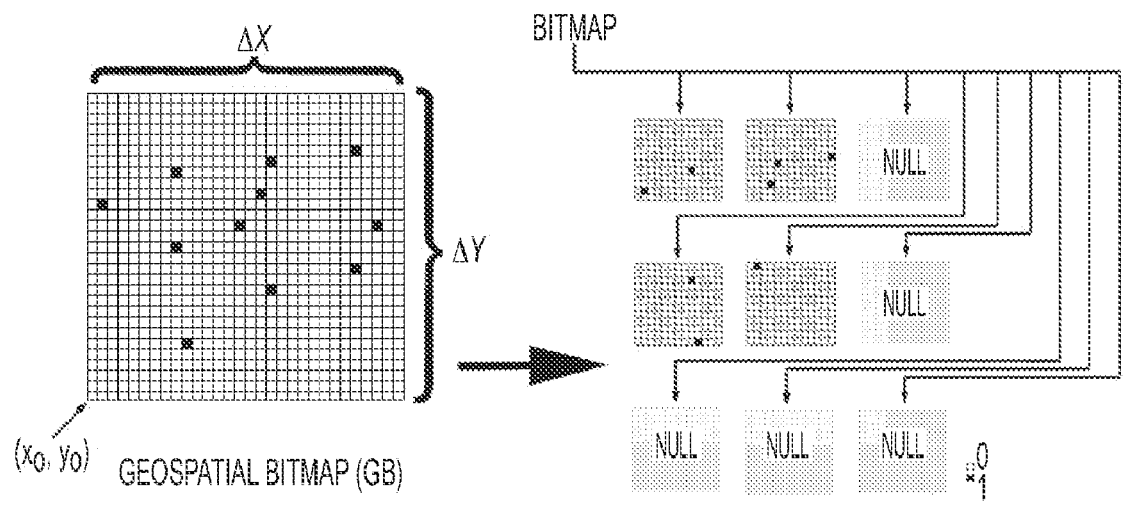
FIG. 18 illustrates how a geospatial data structure breaks a bitmap into submaps for use in a computer aided search module.

The GB data structure minimizes computer memory by breaking its bitmap into submaps, as seen in FIG. 18. The submaps are 2D tiles of equal size, which are actually pointers to byte arrays. The individual bits represent the cells of the bitmap using bit masking. To determine the number and size of the submaps, a "best fit" algorithm is used. The algorithm attempts to optimize the number, size and shape of the submaps, to minimize wasted space and processing time.

Quadtrees: The fundamental structure of a quadtree is the node. When a quadtree is used to store 2D data, in which the LAT/LON location of the data is one of the primary keys, a node represents one geographical location and can contain attribute fields that describe certain aspects of that location. The precision of the location is driven by the number of levels in the quadtree and the geographic area represented by the root node. A node also contains memory pointers to four other nodes that may or may not exist. At level 0 of the quadtree there is a single node, called the parent node, and the four nodes below in level 1 are called children. Each child node represents a quarter of the total geographic area represented by its parent node. These children can also be parent nodes, each of which can point to four additional children at the next level, etc. Nodes with no children are called leaf nodes.

Figure 19:
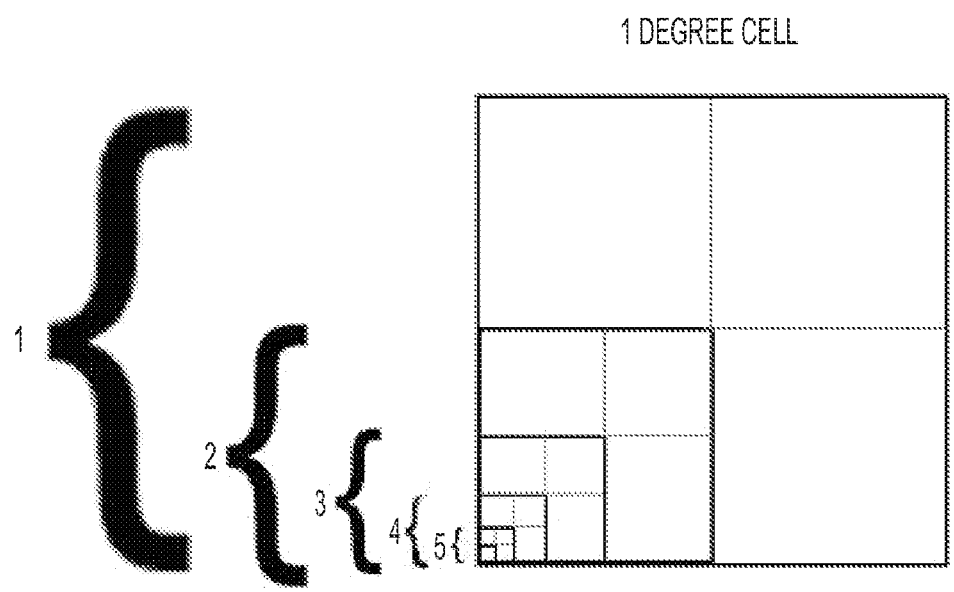
FIG. 19 illustrates how a 6-level quadtree spatially divides a 1-degree LAT/LON cell.

FIG. 19 illustrates how a 6-level quadtree spatially divides a 1-degree LAT/LON cell. In this 6-Level quadtree, each level contains four children nodes except for level 0. Level 0 is the root node which contains only a memory pointer to the four children nodes of level 1. FIG. 20 depicts four levels of a quadtree. Note that if a node has no children or does not contain any data, it does not exist; i.e., memory has not been allocated, and the memory pointer within its parent node is equal to 0, or null.

From any level, to determine which of the four nodes represents the geographical area for a given LAT/LON point, denoted (Y,X), the algorithm compares (Y,X) with the center LAT/LON point $(Y_C, X_C)$, of each node at that level, as follows:

Node 0: $X<Xc$ AND $Y>=Yc$

Node 1: $X>=Xc$ AND $Y>=Yc$

Node 2: $X<Xc$ AND $Y<Yc$

Node 3: $X>=Xc$ AND $Y<Yc$

An exemplary embodiment of the invention uses modified quadtrees (MTREEs) in the CAS algorithm. A MTREE is a modified quadtree data structure, in which certain nodes contain GBs that indicate whether additional nodes exist at lower levels. These GBs reduce the time required to search for and retrieve data stored within the MTREE. The small GBs in the MTREE are called "look-ahead" GBs. Because the underlying structure of the MTREE is a quadtree, the number of rows, $n_r$, and columns, $n_c$, of the GB will always be equal:

$$n_r = n_c = 2^x | x = \text{number of levels to look down.}$$

For example, if a look-ahead GB in the parent node at level 0 indicates the existence of nodes up to and including level 2, then x=2, the size of the GB is 4×4, and the GB is known as a 2-level look-ahead GB. A set bit within the GB indicates that the corresponding node exists, i.e. is not null, at level 2. For example, in the 2-level look-ahead geospatial bitmap of FIG. 20, node 0 in level 2 exists (i.e., its corresponding bit is set), indicating that data exists at that location.

A 7-level MTREE might have 2-level look-ahead GBs on levels 0 and 2 and 4. In this example, each look-ahead GB forecasts the next two levels in the tree. Each time a node is created in the MTREE, the corresponding bit in each look-ahead GB is set. To further increase efficiency during data loading, lookup tables have been created that quickly give the bit row, $b_r$, and column, $b_c$, indices into the two-level look-ahead GB, indicating which bit to set, based on the node numbers:

$$b_r = \begin{bmatrix} 0011 \\ 0011 \\ 2233 \\ 2233 \end{bmatrix} \text{ and } b_c = \begin{bmatrix} 0101 \\ 2323 \\ 0101 \\ 2323 \end{bmatrix}$$

To quickly determine which GB bit to set in the FIG. 21 example, first the unique path in the MTREE to the data of interest is identified as node 3 (level 1) to node 0 (level 2). Next, these node numbers (3, 0) are used as the row and column indices into both lookup tables, from which $b_r$ and $b_c$ are determined to be (2, 2). This corresponds to the bit index (2, 2) in the GB, which must be set to indicate that these nodes (3 in level 1 and 0 in level 2) exist.

Unlike a quadtree, in which a leaf node represents a single geographic location, the leaf node of an MTREE points to a list of all geographic locations that fall within the geographic area represented by the node. The number of degrees of LAT/LON that a node at a given level of the MTREE will represent is determined by:

$$\Delta Lat = \Delta Lon = \frac{1}{2^{level}},$$

In the previous example, a node at level 0 represents an area that is 1 degree of LAT×1 degree of LON; a node at level 1 represents 0.5 degrees LAT×0.5 degrees LON, etc. A lookup table replaces the above calculation, for computational efficiency:

$$\Delta Lat = \Delta Lon = \begin{bmatrix} 1.0 \\ 0.5 \\ 0.25 \\ 0.125 \\ 0.0625 \end{bmatrix} \quad (5\text{-}4)$$

To satisfy the precision requirements of the CAS algorithm (about 11 cm/point for MIW applications), a simple quadtree would require more than 20 levels, which results in a memory prohibitive data structure. An MTREE is illustrated in FIG. 21. The MTREE uses the concepts of a quadtree to decrease search time, and requires fewer levels to retain the desired precision of the data set. As seen in FIG. 21, since each leaf node of the MTREE points to a list of one or more points contained in the geographic area represented by the node, an increase in the number of levels in the tree results in a decreased average list size. Note that if each list contains at most a single point, the tree is a simple quadtree. Therefore, there is a trade-off between the number of levels chosen for the MTREE and the time required to search for a location of interest (i.e., the algorithm searches through more levels with shorter lists, or vice versa).

Data Loading: The Master Contact Database (MCDB) contains features of interest that were detected on or close to the seafloor in SSI during surveys worldwide. NAVOCEANO extracts a subset of this historical data for roughly the same geographical area as a recent survey (i.e., the area of interest, AOI) when performing change detection. The CAS algorithm loads the center LAT/LON position of each historical feature and related attributes within the AOI by first creating a 2D memory pointer array of 180 rows by 360 columns. Each pointer stores the address of a MTREE containing feature data for a 1-degree LAT/LON cell. A MTREE representing a given 1-degree cell is not actually created until a feature located at a LAT/LON position within the cell is loaded. The memory pointer in the 2D array, which addresses the MTREE, will have a value of null until the MTREE is actually created.

The central LAT/LON location of each historical feature within an AOI is examined to determine in which 1-degree cell it resides. The LAT values are shifted from a range of {−90, . . . , 90} to {0, . . . , 180} by truncating the LAT, reducing it by 1 if the result is less than 0, and adding 90. The LON values are shifted from a range of {−180, . . . , 180} to {0, . . . , 360} in a similar manner. The resulting LAT/LON or $(Y_S, X_W)$ value represents the lower-left (southwest) corner of the 1-degree cell and is used as a direct index into the 2D pointer array.

A MTREE is created if the corresponding pointer is null. The null value is replaced with the address of the root node of the MTREE. Next, all nodes in the path between the root node and each leaf node are created. At any given level, the four conditional checks (5-1) are made to determine which node must be created. The resolution of any given node (Δlat and Δlon) is found quickly by using a lookup table. The last level (i.e., the level of the leaf nodes) is where the features and the feature attributes are stored.

Certain nodes in the path will contain look-ahead GBs, as discussed in a previous section. If the look-ahead GBs do not already exist, they are created at this point in the process. Bits that represent the nodes created in the path are set. The bit row and column corresponding to each node is found by using lookup tables.

Searching for Spatially Close Features: The search algorithm within CAS, based on the central LAT/LON location of a mine-like contact (MILCO) from a recent survey, must find all spatially close MILCOs in the historical MCDB, while accounting for position error within and between the two data sets. The results from the search are then sent to the next stage of the ACDC process, which performs the FM to determine if any of the historical features are the same as the recent MILCO. If a match is not found, the recent feature is marked as a new MILCO.

Figure 22A:
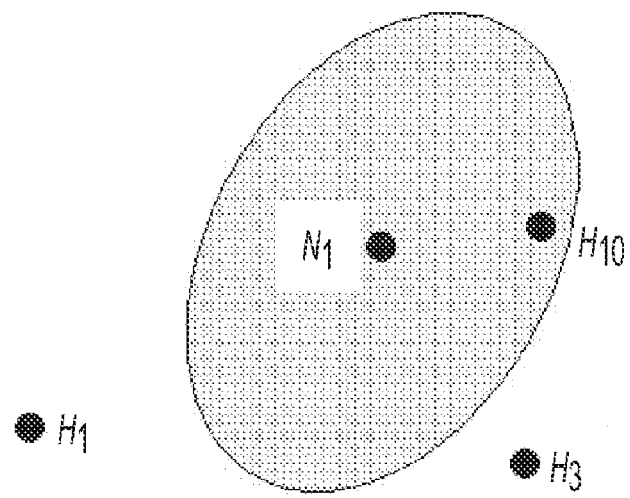
FIGS. 22A, 22B, and 22C illustrate steps in a computer aided search algorithm, in accordance with an embodiment of the invention.

The search algorithm manages this efficiently by using position error estimates, logical GB operations, and a two-step process. As shown in FIG. 22A, the first step attempts to find all historical MILCOs within a region of uncertainty generated around each new MILCO. If this fails to produce a match during the FM stage, the search algorithm then performs the second step, shown in FIG. 22B, which returns all historical MILCOs with an uncertainty region that overlaps the uncertainty region of the new MILCO. The regions of uncertainty are based on errors estimated during the survey, such as navigation and sensor errors.

Figure 22B:
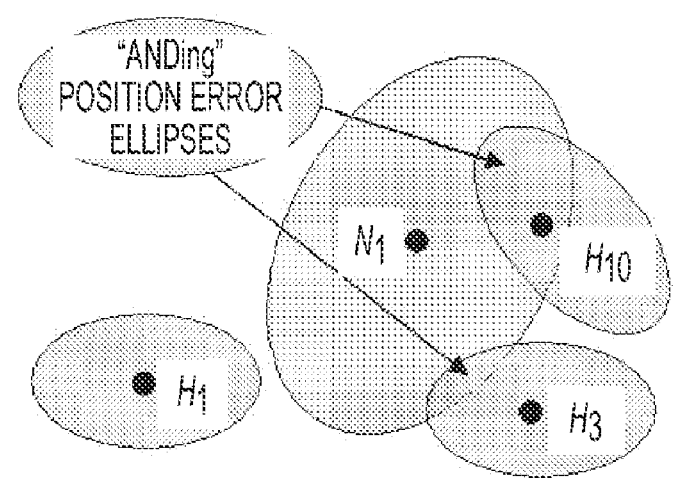

As seen in FIGS. 22A and 22B, step 1 searching returns the location of one historical MILCO, $H_{10}$, because it falls within the uncertainty error region of the recently detected MILCO, $N_1$. If the FM process did not determine that $H_{10}$ was the same as $N_1$, then step 2 searching is performed, determining that both $H_3$ and $H_{10}$ are spatially close to $N_1$ because their error regions overlap the error region of $N_1$.

Figure 22C:
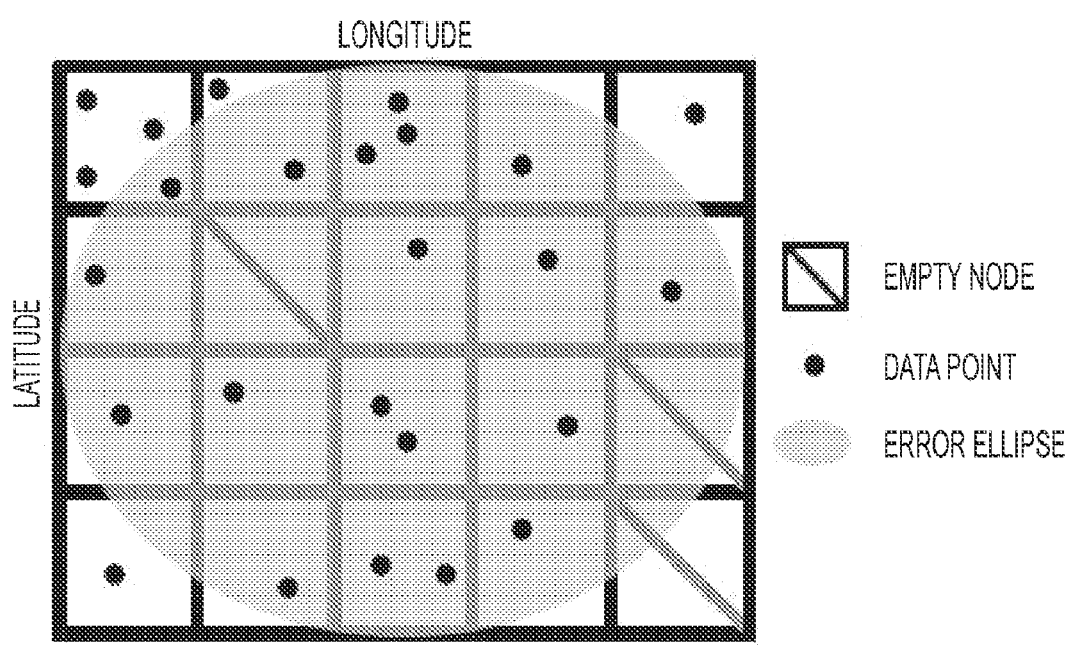

The shape of the error region can be complex or as simple as a circle or ellipse. As seen in FIG. 22C, for step 1, all the leaf nodes that fall within the error region are determined using a GB, called the error GB. Starting with the root node, the minimum-bounding rectangle (MBR) of the error region is determined. The size of the error GB is the minimum of the side of the MBR and the size of the look-ahead GB. The resolution of the error GB is equal to that of the look-ahead GB. Next, bits in the error GB that fall inside the error region are set. For example, in FIG. 23C, this GB would have 4 rows and 5 columns with every bit set). This error GB is then logically ANDed with the current look-ahead GB. The resulting GB is traversed one bit at a time; each set bit represents a node that exists. If the node is a leaf, the list of points within the node will be sent to the FM algorithm. If the node is not a leaf, it will contain another look-ahead GB, and the algorithm will repeat, using the current look-ahead GB in place of the previous. FIG. 22C illustrates all the MTREE leaf nodes falling within error ellipse for the feature of interest.

For step 2, the algorithm repeats step 1, but with an enlarged error region. The increased size should be sufficient to find all points within the historical database that need to be checked to determine whether their error regions overlap with the new MILCO's error region. Rather than sending all of the resulting leaf nodes' lists of points to the FM algorithm, as in step 1, step 2 checks whether the historical error region of each point overlaps the pre-expanded error region of the new MILCO, via GB logical operations. If so, the point is sent to the FM algorithm. If not, it is ignored.

Algorithms can be evaluated according to many different criteria, but a good measure of performance is the rate of growth in time required to solve larger and larger instances of the same problem. The time needed by an algorithm expressed as a function of the size of a problem is called the time complexity of the algorithm.

In one test of the CAS algorithm, the processing time required for the CAS algorithm using 7 level MTREEs with two level look-ahead GBs on levels 0, 2, and 4 to perform LAT/LON queries and return all spatially close data points within a region of error was recorded for four randomly generated data sets of 600, 1500, 3000, and 10000 points. The resulting times were compared to the measured processing time from another search algorithm operating on the same data points. This search algorithm used a 2D array to store the data points and a method to calculate the great-circle distance between two LAT/LON points, referred to as a "Great Circle Distance Method (GCDM)". The CAS algorithm performed better for test cases than the GCDM. The radius of the error region had no significant effect on time for either algorithm. As the number of points increased, the difference in processing time between the two algorithms became more pronounced (e.g., GCDM ran only 1.05 times slower than CAS with 600 points, but GCDM ran 1.75 times slower than CAS for 10,000 points). Thus, the CAS algorithm can be a better choice than GCDM for geospatial search applications, particularly on very large data sets.

Feature Matching Module

A feature matching algorithm can be used to automatically determine whether a new contact matches one of the historical contacts. New objects that are not matched, i.e., not in the database, are identified as "new objects" (change detection). In an exemplary embodiment, the feature matching algorithm uses a wavelet network.

EXAMPLES

Figure 23:
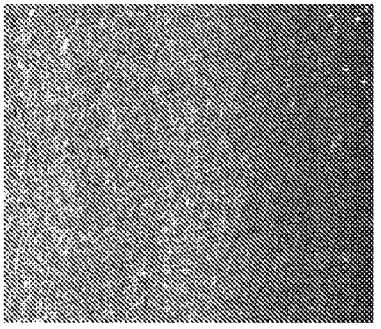
FIG. 23 illustrates some objects found by a side scan sonar processing system in accordance with an embodiment of the invention, and the change detection survey and historical imagery.
Figure 24:
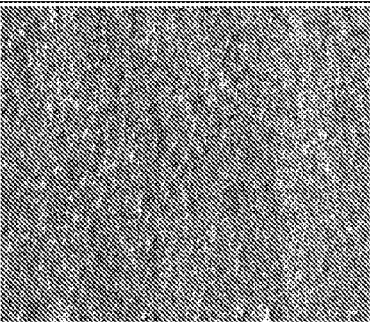
FIG. 24 illustrates some objects that were not found by a side scan sonar processing system in accordance with an embodiment of the invention, and the change detection survey and historical imagery.

Some specimens and results are shown in FIGS. 23 and 24. In one test, the survey area consists of five one-nautical mile long lines in shallow water (20 meters) and five two-nautical mile long lines in deep water (55 meters). Since the set sonar range for the sidescan sonars was 50 meters, the survey lines were spaced at 37.5 meters to allow for 100% overlap. Baseline surveys were conducted by each sonar in the shallow and deep areas, and the location of pre-existing contacts were determined. This information was used to populate a "historical" master contact database.

Ten objects representing mine shapes were then placed over the survey area, with five in the deep portion and five in the shallow portion. The objects were plywood boxes and lead pipes. ACDC-RT analysts missed one of each and found one of each. One possible reason for the inability to detect the missed objects was the placement of these missed mine shapes at the edge of the survey area.

Change detection surveys were then run by the sonars. The positions of the newly placed mine shapes were unknown to the change detection testing participants. While the change detection surveys were being conducted, ACDC-RT was running and identifying potential new targets.

After the RT change detection portion of the experiment was complete, ground truth positions were compared with the potential new contact positions called by analysts using ACDC-RT. For the typical sidescan sonar, eight of the ten newly placed mine shapes were correctly identified by ACDC-RT analysts as new contact. The baseline snippets and the change detect snippets and pictures for some of the correctly identified mine shapes are shown in FIG. 23. Two newly placed contacts that were not identified by ACDC-RT analysts were a cement-filled plywood box and a cement-filled lead pipe. The baseline snippets and the change detect snippets and pictures of these two missed shapes are shown in FIG. 24.

In this test, 80% of the newly placed shapes were identified. The operators missed one each of cement-filled lead pipe and one cement filled plywood box and found one of each. One possible reason for the inability to detect the missed objects is the placement of these missed mine shapes at the edge of the survey area.

The automated change detection system described herein allows mine warfare commanders to rapidly identify newly placed mine-like objects, to identify determine where assault lanes should be geographically placed and to estimate the time and resources needed to clear the lanes of explosive mines. to send mine hunters to disarm the mines.

Figures 25A, 25B:
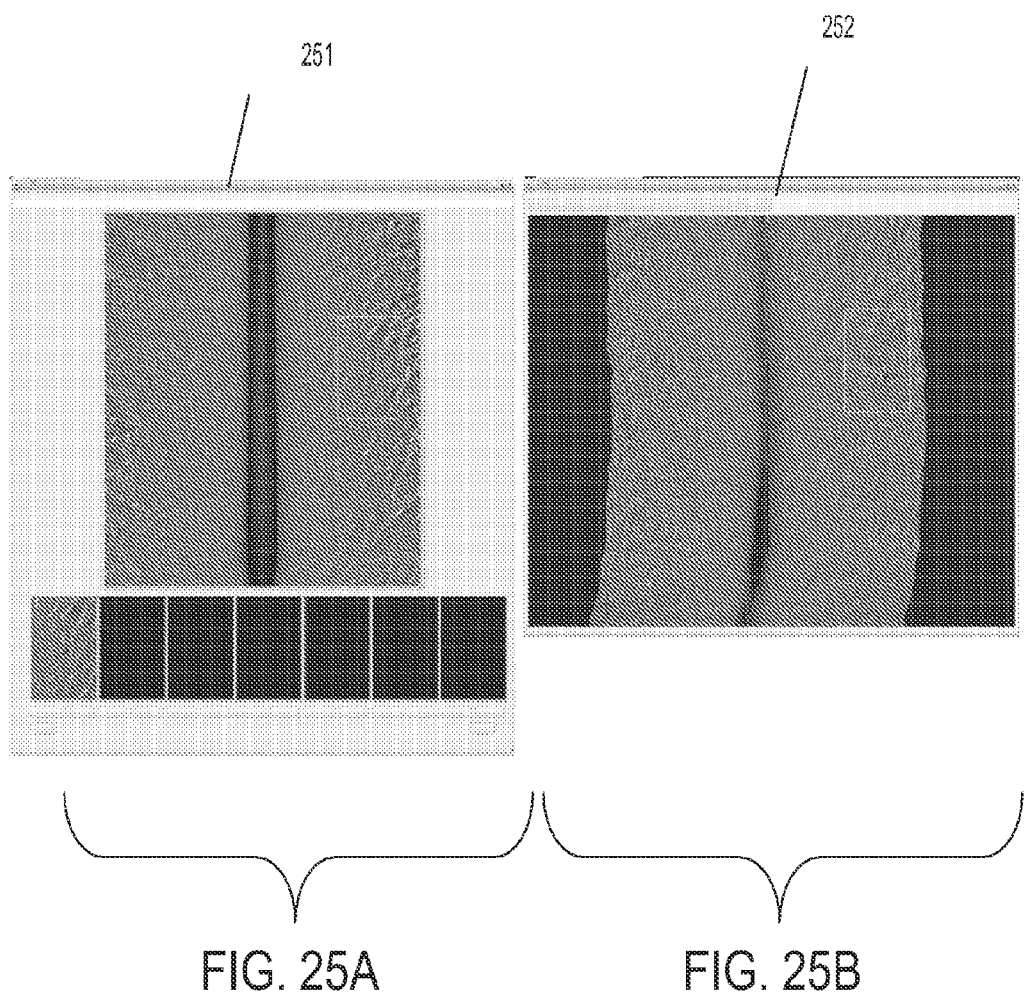
FIGS. 25A and 25B illustrate real time and historical displays based on displaying the historical imagery in time-based scanline format.

Note that an alternative to using georeferenced area-based tiles for display of the historical SSI is to compute the LAT/LON position of the imagery being collected (and displayed in the new imagery display) and display the spatially-closest scanline (extracted from the historical UNISIPS files) in the historical display. This method produced an adequate historical display for change detection when the new sonar track was very close to the track of the historical imagery. However, if the track lines and/or angle of attack are different, the historical display becomes unreadable. See, for example, FIGS. 25A and 25B, which illustrate change detection survey imagery 251 and historical imagery displays 252 based on displaying the historical imagery in time-based scanline format.

Embodiments of the invention are directed to computer systems for accomplishing the methods discussed in the description herein, and to computer readable media containing programs for accomplishing these methods. The raw data and results (side scan sonar images and data, area based tiles, contact data, position information snippets, etc.) can be stored for future retrieval and processing, printed, displayed, transferred to another computer, and/or transferred to a mine hunting vessel. Communications links can be wired or wireless, for example, using cellular communication systems, military communications systems, and satellite communications systems.

The system can be operated on side scan sonar from any suitable side scan sonar image. One example of a suitable sonar system is the Klein 5000 towed sonar system. In addition, the historical SSI and the change detection survey SSI can be collected by the same or different side scan sonar systems.

The computer aided search algorithm and feature matching algorithms can be used to process other types of images, such as, but not limited to, other types of sonar data, radar images, satellite images, and optical images.

In an exemplary embodiment, the software for the system is written in C++, and the graphical user interface (GUI) is written in Qt, a commercial software program sold by Trolltech, headquartered in Oslo, Norway. The system operates on a computer having four central processing units, each CPU being a dual-core, 2 GB, 64 bit CPU. Other alternative computer platforms can be used. The operating system can be Windows, Linux, or Macintosh.

The invention is also directed to software for accomplishing the methods discussed herein, and computer readable media storing software for accomplishing these methods.

The conversion of time-based files to area-based tiles can be accomplished on the same CPU that is used to receive the change detection survey imagery and control the displays, or can be accomplished on a different computer. If the latter, the area-based tiles are transferred to the CPU that used to receive the change detection survey imagery and control the displays.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed as new and desired to be protected by Letters Patent of the United States is:

1. A computer-implemented method for processing real-time side scan sonar imagery from a side scan sonar, comprising:
    displaying change detection side scan sonar imagery during a change detection side scan sonar survey; and
    simultaneously displaying historical side scan sonar imagery in an area-based tile format from one or more previous side scan sonar surveys of the same geospatial location, the historical side scan sonar imagery that is displayed being geospatially co-registered with a current geospatial position of the side scan sonar, and the historical side scan sonar imagery having been converted from time-based data files into area-based tiles.

2. The method according to claim 1, wherein the time-based side scan sonar imagery is UNISIPS format data.

3. The method according to claim 1, further comprising:
    rotating the displayed historical side scan sonar data to match the heading of the change detection side scan sonar as the data is displayed.

4. The method according to claim 1, further comprising:
    automatically determining whether a feature in the change detection side scan sonar imagery is present in the historical side scan sonar imagery.

5. The method according to claim 1, further comprising:
    saving the position of features in the change detection side scan sonar imagery, saving snippets of the feature, and displaying the snippets.

6. The method according to claim 1, wherein said historical side scan sonar imagery was converted from time-based data files into area-based tiles before beginning the change detection side scan survey.

7. The method according to claim 1, further comprising:
    processing the features in the change detection side scan sonar imagery to determine whether they are within a predetermined size and shape range.

8. The method according to claim 1, further comprising:
    updating the historical display during the change detection survey, said updating including:
    computing the LAT/LON extents of the entire historical display based on the change detection survey imagery's LAT/LON position and heading,
    computing the minimum and maximum tile rows and columns and determining which tiles are geographically inside the display extents,
    rotating each sample within each of the tiles to match the new imagery heading, and
    displaying the rotated samples on the display of the historical side scan imagery.

9. The method according to claim 1, further comprising:
    automated detection of clutter on the seafloor by
    calculating an upper threshold and a lower threshold for each scanline,
    wherein pixels in the scanline with a sample value above an upper threshold are brights, and pixels in the scanline with a sample value below a lower threshold are shadows.

10. The method according to claim 9, wherein said calculating an upper threshold and a lower threshold includes only pixels outside a nadir portion of the scanline.

11. The method according to claim 9, further comprising:
    examining scanlines to detect runs of shadows followed by runs of brights.

12. The method according to claim 9, further comprising:
    receiving at least one instruction to process an object in the change detection survey side scan sonar imagery;
    determining whether a size and shape of the selected object are within a predetermined range; and
    determining whether the object matches an object in the historical side scan sonar imagery.

13. The method according to claim 12, further comprising:
    displaying a box around the object on the change detection side scan sonar display; and
    changing the color of the box if the object is matched to an object in the historical side scan sonar imagery.

14. The method according to claim 10 further comprising:
    determining whether the shadow falls away from the nadir portion and has an adjacent bright closer to the nadir portion and whether the length of the shadow is consistent with a preset object size.

15. The method according to claim 12, further comprising:
    creating a snippet centered on the center of the bright by creating a box around the center point, the box having a preset dimension around the object, the box including an image; and
    saving the image within the box in a UNISIPS format.

16. The method according to claim 4 comprising:
    for each contact in the change detection sonar imagery, finding contacts in the historical side scan sonar data in a region of uncertainty generated around the change detection sonar contact, and identifying the found historical contacts as a possible match; and
    if no historical contact falls within the region of uncertainty, returning all the historical contacts that have an uncertainty region that overlaps the uncertainty region of the change detection sonar contact, and identifying the returned historical contacts as possible matches.

17. The method according to claim 16, further comprising:
    if no matches between the historical data and the change detection sonar survey contact are found, identifying the change detection sonar survey contact as a new contact, and saving the geospatial position and an image file of the new contact.

18. A computer system for processing real-time side scan sonar imagery, comprising:
    a processing unit;
    at least one display screen operatively connected to the processing unit;
    a user input device operatively connected to the processing unit;
    a receiver for receiving the side scan sonar imagery from a side scan sonar system, the receiver operatively connected to the processing unit;
    the processing unit having software configured for:

displaying change detection side scan sonar imagery during a change detection side scan sonar survey, and simultaneously displaying historical side scan sonar imagery in an area-based tile format from one or more previous side scan sonar surveys of the same geospatial location, the historical side scan sonar imagery that is displayed being geospatially co-registered with a current geospatial position of the side scan sonar, and the historical side scan sonar imagery having been converted from time-based data files into area-based tiles.

19. The computer system according to claim 18 wherein said computer software is further configured for:

calculating an upper threshold and a lower threshold for each scanline in the side scan sonar imagery, wherein pixels in the scanline with a sample value above an upper threshold are brights, and pixels in the scanline with a sample value below a lower threshold are shadows;

examining the scanlines to detect runs of the shadows followed by runs of the brights; and determining whether the shadow falls away from a nadir position and has an adjacent of the brights closer to the nadir position and whether the length of the shadow is consistent with a preset object size.

20. The computer system according to claim 18 wherein said software is further configured for:

for each contact in the change detection side scan sonar imagery, finding contacts in the historical side scan sonar imagery in a region of uncertainty generated around a change detection sonar contact, and identifying the found historical contacts as a possible match; and if no historical contact falls within the region of uncertainty, returning all the historical contacts having an overlapping uncertainty region that overlaps the uncertainty region of the change detection sonar contact, and identifying the returned historical contacts as possible matches.

* * * * *